(12) United States Patent
Khoshnevisan et al.

(10) Patent No.: US 11,652,668 B2
(45) Date of Patent: May 16, 2023

(54) FREQUENCY DIVISION MULTIPLEXING MAPPING OF TRANSMISSION CONFIGURATION INDICATOR STATES TO A CONTROL CHANNEL

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Jing Sun, San Diego, CA (US); Arumugam Chendamarai Kannan, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/118,958

(22) Filed: Dec. 11, 2020

(65) Prior Publication Data

US 2021/0226820 A1 Jul. 22, 2021

Related U.S. Application Data

(60) Provisional application No. 62/962,067, filed on Jan. 16, 2020.

(51) Int. Cl.
*H04B 7/26* (2006.01)
*H04W 72/04* (2009.01)
(Continued)

(52) U.S. Cl.
CPC ....... *H04L 25/0204* (2013.01); *H04B 7/0456* (2013.01); *H04B 7/2621* (2013.01);
(Continued)

(58) Field of Classification Search
CPC ............. H04L 25/0202; H04L 25/0204; H04L 25/0228; H04L 5/0007; H04L 5/0042;
(Continued)

(56) References Cited

U.S. PATENT DOCUMENTS

2019/0349907 A1* 11/2019 Seo ........................ H04L 5/0048
2020/0153581 A1* 5/2020 Tsai ..................... H04L 27/2602
(Continued)

FOREIGN PATENT DOCUMENTS

WO WO-2019244222 A1 12/2019

OTHER PUBLICATIONS

International Search Report and Written Opinion—PCT/US2020/064823—ISA/EPO—dated Mar. 24, 2021 (201501WO).
(Continued)

*Primary Examiner* — Joshua Kading
(74) *Attorney, Agent, or Firm* — Holland & Hart LLP

(57) ABSTRACT

Methods, systems, and devices for wireless communications are described. In some systems, a base station may transmit to a user equipment (UE) over a control channel (e.g., a downlink control channel) and the UE may monitor for the control channel in a control resource set (CORSET). The control channel and the CORESET may be associated with a set of transmission configuration indicator (TCI) states. The base station and the UE may identify an association between the resources of the CORESET and the set of TCI states based on a frequency division multiplexing (FDM) mapping between the resources of the CORESET and the set of TCI states. In some examples, the association may be a fixed rule at the UE. In other examples, the base station may signal the association to the UE via control signaling. The UE may decode the control channel based on the FDM mapping.

28 Claims, 23 Drawing Sheets

(51) Int. Cl.
| | |
|---|---|
| *H04L 5/00* | (2006.01) |
| *H04L 25/02* | (2006.01) |
| *H04W 28/06* | (2009.01) |
| *H04B 7/0456* | (2017.01) |
| *H04W 72/044* | (2023.01) |

(52) U.S. Cl.
CPC ............ *H04L 5/005* (2013.01); *H04L 5/0042* (2013.01); *H04L 5/0048* (2013.01); *H04L 5/0051* (2013.01); *H04L 5/0058* (2013.01); *H04L 5/0094* (2013.01); *H04L 25/0228* (2013.01); *H04W 28/06* (2013.01); *H04W 72/042* (2013.01); *H04W 72/044* (2013.01); H04L 5/001 (2013.01); H04L 25/0202 (2013.01)

(58) Field of Classification Search
CPC ....... H04L 5/0048; H04L 5/001; H04L 5/005; H04L 5/0051; H04L 5/0053; H04L 5/0058; H04L 5/0092; H04L 5/0094; H04B 7/0456; H04B 7/2621; H04W 28/06; H04W 72/042; H04W 72/044; H04W 4/18; H03M 7/30; H03M 7/3068
See application file for complete search history.

(56) References Cited

U.S. PATENT DOCUMENTS

| | | | | |
|---|---|---|---|---|
| 2020/0187171 | A1* | 6/2020 | Hwang | H04L 5/003 |
| 2021/0029678 | A1* | 1/2021 | Liu | H04L 5/0053 |
| 2021/0058805 | A1* | 2/2021 | Ji | H04B 7/0695 |
| 2021/0084590 | A1* | 3/2021 | Nam | H04W 52/0216 |
| 2021/0143943 | A1* | 5/2021 | Zhou | H04W 72/0493 |
| 2021/0227526 | A1* | 7/2021 | Khoshnevisan | H04W 24/02 |
| 2021/0306986 | A1* | 9/2021 | Takahashi | H04L 27/26 |
| 2022/0015035 | A1* | 1/2022 | Choi | H04W 52/0212 |
| 2022/0022237 | A1* | 1/2022 | Kim | H04L 5/0055 |
| 2022/0046691 | A1* | 2/2022 | Kim | H04B 7/024 |
| 2022/0255710 | A1* | 8/2022 | Taherzadeh Boroujeni | H04L 5/0007 |

OTHER PUBLICATIONS

LG Electronics: "Discussion on NR-PDCCH Structure", R1-1713164, 3GPP TSG RAN WG1 Meeting #90, 3rd Generation Partnership Project (3GPP), Mobile Competence Centre; 650, Route Des Lucioles; F-06921 Sophia-Antipolis Cedex; France, vol. RAN WG1, Aug. 21, 2017 (Aug. 21, 2017), XP051315973, Retrieved from the Internet: URL: http://www.3gpp.org/ftp/Meetings_3GPP_SYNC/RAN1/Docs/ [retrieved on Aug. 21, 2017] p. 1, "Agreements" and pp. 3-4, Options 1 and 2.

Nokia, et al., "Enhancements on Multi-TRP/Panel Transmission", 3GPP Draft; R1-1902563, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 16, 2019 (Feb. 16, 2019), 19 Pages, XP051600257, Retrieved from the Internet: URL: http://www.3gpp.org/ftp/tsg%5Fran/WG1%5FRL1/TSGR1%5F96/Docs/R1%2D1902563%2Ezip [retrieved on Feb. 16, 2019] Sections 3.2 and 4.1.

OPPO: "Enhancements on Multi-TRP and Multi-Panel Transmission", 3GPP TSG RAN WG1 Ad-Hoc Meeting 1901, 3GPP Draft; R1-1900266, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, 7 Pages, Jan. 20, 2019 (Jan. 20, 2019), XP051593180, Retrieved from the Internet: URL: http://www.3gpp.org/ftp/Meetings%5F3GPP%5FSYNC/RAN1/Docs/R1%2D1900266%2Ezip [retrieved on Jan. 20, 2019] p. 3, sub-section CORESET/search space configuration and blind detection.

* cited by examiner

FREQUENCY DIVISION MULTIPLEXING MAPPING OF TRANSMISSION CONFIGURATION INDICATOR STATES TO A CONTROL CHANNEL

CROSS REFERENCE

The present Application for Patent claims the benefit of U.S. Provisional Patent Application No. 62/962,067 by KHOSHNEVISAN et al., entitled "FREQUENCY DIVISION MULTIPLEXING MAPPING OF TRANSMISSION CONFIGURATION INDICATOR STATES TO A CONTROL CHANNEL," filed Jan. 16, 2020, assigned to the assignee hereof, and expressly incorporated by reference herein.

TECHNICAL FIELD

The following relates generally to wireless communications and more specifically to communication channels associated with multiple transmission configuration indicator (TCI) states.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Further improvements in 5G NR technology may be desirable. These improvements may also be applicable to other multi-access technologies and the telecommunication standards that employ these technologies.

SUMMARY

In some wireless communications systems, a device may attempt to decode (e.g., blind decode) a control channel (e.g., a physical downlink control channel (PDCCH)). The device may attempt to decode the control channel in a control resource set (CORESET) and may perform channel estimation based on decoding the control channel to identify channel characteristics associated with the control channel. In some cases, the device may attempt to decode and perform channel estimation of the control channel based on a transmission configuration indicator (TCI) state associated with the control channel. For example, the control channel may be associated with a TCI state, which may provide quasi-colocation information associated with one or more reference signals. The device may use the quasi-colocation information associated with the one or more reference signals to decode and perform channel estimation of the control channel. In some cases, however, such as in cases in which the control channel is associated with a relatively poor channel quality, the quasi-colocation information provided by a single TCI may be insufficient.

The described techniques relate to improved methods, systems, devices, and apparatuses that support frequency division multiplexing (FDM) mapping of TCI states to a control channel. Generally, the described techniques provide for enhanced diversity and reliability of a control channel (e.g., a downlink control channel). In some wireless communications systems, a user equipment (UE) may attempt to receive and decode (e.g., blind decode) a downlink control channel in a CORESET. In some examples, the UE may receive a configuration message from a base station indicating that the CORESET is associated with a set of TCI states. The UE may identify an association between the resources of the CORESET and the set of TCI states. The association between the resources of the CORESET and the set of TCI states may correspond to an FDM mapping and, accordingly, the set of TCI states may map to different frequency resources associated with the CORESET. The UE may decode the downlink control channel based on the FDM mapping between the resources of the CORESET and the TCI states.

A method of wireless communications at a UE is described. The method may include receiving a configuration message indicating that a CORESET associated with a downlink control channel is associated with a set of TCI states, identifying an association between resources of the CORESET and the set of TCI states based on an FDM mapping, and decoding the downlink control channel based on the FDM mapping.

An apparatus for wireless communications at a UE is described. The apparatus may include a processor, memory coupled (e.g., operatively, communicatively, functionally, electronically, or electrically) with the processor, and instructions stored in the memory. The instructions may be executable by the processor to cause the apparatus to receive a configuration message indicating that a CORESET associated with a downlink control channel is associated with a set of TCI states, identify an association between resources of the CORESET and the set of TCI states based on an FDM mapping, and decode the downlink control channel based on the FDM mapping.

Another apparatus for wireless communications at a UE is described. The apparatus may include means for receiving a configuration message indicating that a CORESET associated with a downlink control channel is associated with a set of TCI states, identifying an association between resources of the CORESET and the set of TCI states based on an FDM mapping, and decoding the downlink control channel based on the FDM mapping.

A non-transitory computer-readable medium storing code for wireless communications at a UE is described. The code may include instructions executable by a processor to receive a configuration message indicating that a CORESET associated with a downlink control channel is associated with a set of TCI states, identify an association between resources of the CORESET and the set of TCI states based on an FDM mapping, and decode the downlink control channel based on the FDM mapping.

In some examples of the method, apparatuses, and non-transitory computer-readable medium described herein, the FDM mapping includes a first association between a first set of resource element group (REG) bundles of the CORESET and a first TCI state of the set of TCI states, and a second association between a second set of REG bundles of the CORESET and a second TCI state of the set of TCI states.

Some examples of the method, apparatuses, and non-transitory computer-readable medium described herein may further include operations, features, means, or instructions for identifying from the configuration message that a precoder granularity for the CORESET may be configured as wideband channel estimation.

In some examples of the method, apparatuses, and non-transitory computer-readable medium described herein, the first set of REG bundles of the CORESET may be defined by a ceiling function of a total number of REG bundles of the CORESET divided by two, and the second set of REG bundles of the CORESET may be defined by a difference between the total number of REG bundles of the CORESET and the first set of REG bundles.

Some examples of the method, apparatuses, and non-transitory computer-readable medium described herein may further include operations, features, means, or instructions for receiving control signaling indicating the first set of REG bundles of the CORESET, and determining the second set of REG bundles of the CORESET based on a difference between a total number of REG bundles of the CORESET and the first set of REG bundles.

In some examples of the method, apparatuses, and non-transitory computer-readable medium described herein, the first set of REG bundles of the CORESET may be defined by a ceiling function of a total number of REG bundles divided by two within each subset of contiguous resource blocks of the CORESET, and the second set of REG bundles of the CORESET may be defined by a difference between the total number of REG bundles within each subset of contiguous resource blocks of the CORESET and the first set of REG bundles within each subset of contiguous resource blocks of the CORESET.

Some examples of the method, apparatuses, and non-transitory computer-readable medium described herein may further include operations, features, means, or instructions for receiving control signaling indicating the first set of REG bundles of the CORESET within each subset of contiguous resource blocks of the CORESET, and determining the second set of REG bundles of the CORESET based on a difference between a total number of REG bundles of the CORESET within each subset of contiguous resource blocks of the CORESET and the first set of REG bundles within each subset of contiguous resource blocks of the CORESET.

Some examples of the method, apparatuses, and non-transitory computer-readable medium described herein may further include operations, features, means, or instructions for receiving control signaling indicating the first set of REG bundles of the CORESET and the second set of REG bundles of the CORESET.

In some examples of the method, apparatuses, and non-transitory computer-readable medium described herein, the first set of REG bundles of the CORESET may be assigned to a first set of subsets of contiguous resource blocks of the CORESET, and the second set of REG bundles of the CORESET may be assigned to a second set of subsets of contiguous resource blocks of the CORESET.

Some examples of the method, apparatuses, and non-transitory computer-readable medium described herein may further include operations, features, means, or instructions for identifying from the configuration message that a precoder granularity for the CORESET may be configured as narrowband channel estimation.

In some examples of the method, apparatuses, and non-transitory computer-readable medium described herein, the first set of REG bundles of the CORESET may be defined by a ceiling function of a total number of REG bundles of the CORESET divided by two, and the second set of REG bundles of the CORESET may be defined by a difference between the total number of REG bundles of the CORESET and the first set of REG bundles.

In some examples of the method, apparatuses, and non-transitory computer-readable medium described herein, the first set of REG bundles of the CORESET includes REG bundles with even index numbers, and the second set of REG bundles of the CORESET includes REG bundles with odd index numbers.

Some examples of the method, apparatuses, and non-transitory computer-readable medium described herein may further include operations, features, means, or instructions for receiving control signaling indicating the first set of REG bundles of the CORESET and the second set of REG bundles of the CORESET.

In some examples of the method, apparatuses, and non-transitory computer-readable medium described herein, the FDM mapping includes a first association between a first set of REG bundles of a set of control channel elements and a first TCI state of the set of TCI states, and a second association between a second set of REG bundles of the set of control channel elements and a second TCI state of the set of TCI states.

In some examples of the method, apparatuses, and non-transitory computer-readable medium described herein, the first set of REG bundles includes REG bundles with even index numbers from control channel elements with even index numbers and REG bundles with odd index numbers from control channel elements with odd index numbers, and the second set of REG bundles includes REG bundles with odd index numbers from control channel elements with even index numbers and REG bundles with even index numbers from control channel elements with odd index numbers.

In some examples of the method, apparatuses, and non-transitory computer-readable medium described herein, a first set of REG bundle indices may be mapped to a second set of REG bundle indices based on an interleaver size, the first set of REG bundles include REG bundles having even indices from the first set of REG bundle indices, and the second set of REG bundles include REG bundles having odd indices from the first set of REG bundle indices.

In some examples of the method, apparatuses, and non-transitory computer-readable medium described herein, the first set of REG bundles includes REG bundles from a first set of downlink control channel candidates, and the second set of REG bundles includes REG bundles from a second set of downlink control channel candidates.

In some examples of the method, apparatuses, and non-transitory computer-readable medium described herein, the set of control channel elements includes a set of control channel elements corresponding to a downlink control channel candidate.

In some examples of the method, apparatuses, and non-transitory computer-readable medium described herein, the FDM mapping includes a first association between a first set of REG bundles of a set of super-bundles and a first TCI state of the set of TCI states, and a second association between a second set of REG bundles of the set of super-bundles and a second TCI state of the set of TCI states.

In some examples of the method, apparatuses, and non-transitory computer-readable medium described herein, a mapping between the resources of the CORESET and control channel elements may be mapped in units of super-bundles.

Some examples of the method, apparatuses, and non-transitory computer-readable medium described herein may further include operations, features, means, or instructions for receiving control signaling indicating a value for a REG bundle size corresponding to REG bundles of the CORESET, where a mapping type of the CORESET may be configured as non-interleaved.

In some examples of the method, apparatuses, and non-transitory computer-readable medium described herein, one or more REG bundles include a first TCI state of the set of TCI states for a first set of resource blocks of the one or more REG bundles and a second TCI state of the set of TCI states for a second set of resource blocks of the one or more REG bundles.

In some examples of the method, apparatuses, and non-transitory computer-readable medium described herein, the UE assumes a same precoding within resource blocks having a same TCI state for channel estimation for a downlink control channel candidate.

In some examples of the method, apparatuses, and non-transitory computer-readable medium described herein, the configuration message includes radio resource control signaling.

A method of wireless communications at a base station is described. The method may include identifying an association between resources of a CORESET associated with a downlink control channel and a set of TCI states based on an FDM mapping and transmitting a configuration message indicating that the CORESET is associated with the set of TCI states.

An apparatus for wireless communications at a base station is described. The apparatus may include a processor, memory coupled (e.g., operatively, communicatively, functionally, electronically, or electrically) with the processor, and instructions stored in the memory. The instructions may be executable by the processor to cause the apparatus to identify an association between resources of a CORESET associated with a downlink control channel and a set of TCI states based on an FDM mapping and transmit a configuration message indicating that the CORESET is associated with the set of TCI states.

Another apparatus for wireless communications at a base station is described. The apparatus may include means for identifying an association between resources of a CORESET associated with a downlink control channel and a set of TCI states based on an FDM mapping and transmitting a configuration message indicating that the CORESET is associated with the set of TCI states.

A non-transitory computer-readable medium storing code for wireless communications at a base station is described. The code may include instructions executable by a processor to identify an association between resources of a CORESET associated with a downlink control channel and a set of TCI states based on an FDM mapping and transmit a configuration message indicating that the CORESET is associated with the set of TCI states.

In some examples of the method, apparatuses, and non-transitory computer-readable medium described herein, the FDM mapping includes a first association between a first set of REG bundles of the CORESET and a first TCI state of the set of TCI states, and a second association between a second set of REG bundles of the CORESET and a second TCI state of the set of TCI states.

Some examples of the method, apparatuses, and non-transitory computer-readable medium described herein may further include operations, features, means, or instructions for identifying from the configuration message that a precoder granularity for the CORESET may be configured as wideband channel estimation.

In some examples of the method, apparatuses, and non-transitory computer-readable medium described herein, the first set of REG bundles of the CORESET may be defined by a ceiling function of a total number of REG bundles of the CORESET divided by two, and the second set of REG bundles of the CORESET may be defined by a difference between the total number of REG bundles of the CORESET and the first set of REG bundles.

Some examples of the method, apparatuses, and non-transitory computer-readable medium described herein may further include operations, features, means, or instructions for transmitting control signaling indicating the first set of REG bundles of the CORESET, and determining the second set of REG bundles of the CORESET based on a difference between a total number of REG bundles of the CORESET and the first set of REG bundles.

In some examples of the method, apparatuses, and non-transitory computer-readable medium described herein, the first set of REG bundles of the CORESET may be defined by a ceiling function of a total number of REG bundles divided by two within each subset of contiguous resource blocks of the CORESET, and the second set of REG bundles of the CORESET may be defined by a difference between the total number of REG bundles within each subset of contiguous resource blocks of the CORESET and the first set of REG bundles within each subset of contiguous resource blocks of the CORESET.

Some examples of the method, apparatuses, and non-transitory computer-readable medium described herein may further include operations, features, means, or instructions for transmitting control signaling indicating the first set of REG bundles of the CORESET within each subset of contiguous resource blocks of the CORESET, and determining the second set of REG bundles of the CORESET based on a difference between a total number of REG bundles of the CORESET within each subset of contiguous resource blocks of the CORESET and the first set of REG bundles within each subset of contiguous resource blocks of the CORESET.

Some examples of the method, apparatuses, and non-transitory computer-readable medium described herein may further include operations, features, means, or instructions for transmitting control signaling indicating the first set of REG bundles of the CORESET and the second set of REG bundles of the CORESET.

In some examples of the method, apparatuses, and non-transitory computer-readable medium described herein, the first set of REG bundles of the CORESET may be assigned to a first set of subsets of contiguous resource blocks of the CORESET, and the second set of REG bundles of the CORESET may be assigned to a second set of subsets of contiguous resource blocks of the CORESET.

Some examples of the method, apparatuses, and non-transitory computer-readable medium described herein may further include operations, features, means, or instructions for identifying from the configuration message that a precoder granularity for the CORESET may be configured as narrowband channel estimation.

In some examples of the method, apparatuses, and non-transitory computer-readable medium described herein, the first set of REG bundles of the CORESET may be defined by a ceiling function of a total number of REG bundles of the CORESET divided by two, and the second set of REG bundles of the CORESET may be defined by a difference between the total number of REG bundles of the CORESET and the first set of REG bundles.

In some examples of the method, apparatuses, and non-transitory computer-readable medium described herein, the first set of REG bundles of the CORESET includes REG bundles with even index numbers, and the second set of REG bundles of the CORESET includes REG bundles with odd index numbers.

Some examples of the method, apparatuses, and non-transitory computer-readable medium described herein may further include operations, features, means, or instructions for transmitting control signaling indicating the first set of REG bundles of the CORESET and the second set of REG bundles of the CORESET.

In some examples of the method, apparatuses, and non-transitory computer-readable medium described herein, the FDM mapping includes a first association between a first set of REG bundles of a set of control channel elements and a first TCI state of the set of TCI states, and a second association between a second set of REG bundles of the set of control channel elements and a second TCI state of the set of TCI states.

In some examples of the method, apparatuses, and non-transitory computer-readable medium described herein, the first set of REG bundles includes REG bundles with even index numbers from control channel elements with even index numbers and REG bundles with odd index numbers from control channel elements with odd index numbers, and the second set of REG bundles includes REG bundles with odd index numbers from control channel elements with even index numbers and REG bundles with even index numbers from control channel elements with odd index numbers.

In some examples of the method, apparatuses, and non-transitory computer-readable medium described herein, a first set of REG bundle indices may be mapped to a second set of REG bundle indices based on an interleaver size, the first set of REG bundles include REG bundles having even indices from the first set of REG bundle indices, and the second set of REG bundles include REG bundles having odd indices from the first set of REG bundle indices.

In some examples of the method, apparatuses, and non-transitory computer-readable medium described herein, the first set of REG bundles includes REG bundles from a first set of downlink control channel candidates, and the second set of REG bundles includes REG bundles from a second set of downlink control channel candidates.

In some examples of the method, apparatuses, and non-transitory computer-readable medium described herein, the set of control channel elements includes a set of control channel elements corresponding to a downlink control channel candidate.

In some examples of the method, apparatuses, and non-transitory computer-readable medium described herein, the FDM mapping includes a first association between a first set of REG bundles of a set of super-bundles and a first TCI state of the set of TCI states, and a second association between a second set of REG bundles of the set of super-bundles and a second TCI state of the set of TCI states.

In some examples of the method, apparatuses, and non-transitory computer-readable medium described herein, a mapping between the resources of the CORESET and control channel elements may be mapped in units of super-bundles.

Some examples of the method, apparatuses, and non-transitory computer-readable medium described herein may further include operations, features, means, or instructions for transmitting control signaling indicating a value for a REG bundle size corresponding to REG bundles of the CORESET, where a mapping type of the CORESET may be configured as non-interleaved.

In some examples of the method, apparatuses, and non-transitory computer-readable medium described herein, one or more REG bundles include a first TCI state of the set of TCI states for a first set of resource blocks of the one or more REG bundles and a second TCI state of the set of TCI states for a second set of resource blocks of the one or more REG bundles.

In some examples of the method, apparatuses, and non-transitory computer-readable medium described herein, the configuration message includes radio resource control signaling.

DETAILED DESCRIPTION

Figure 1:
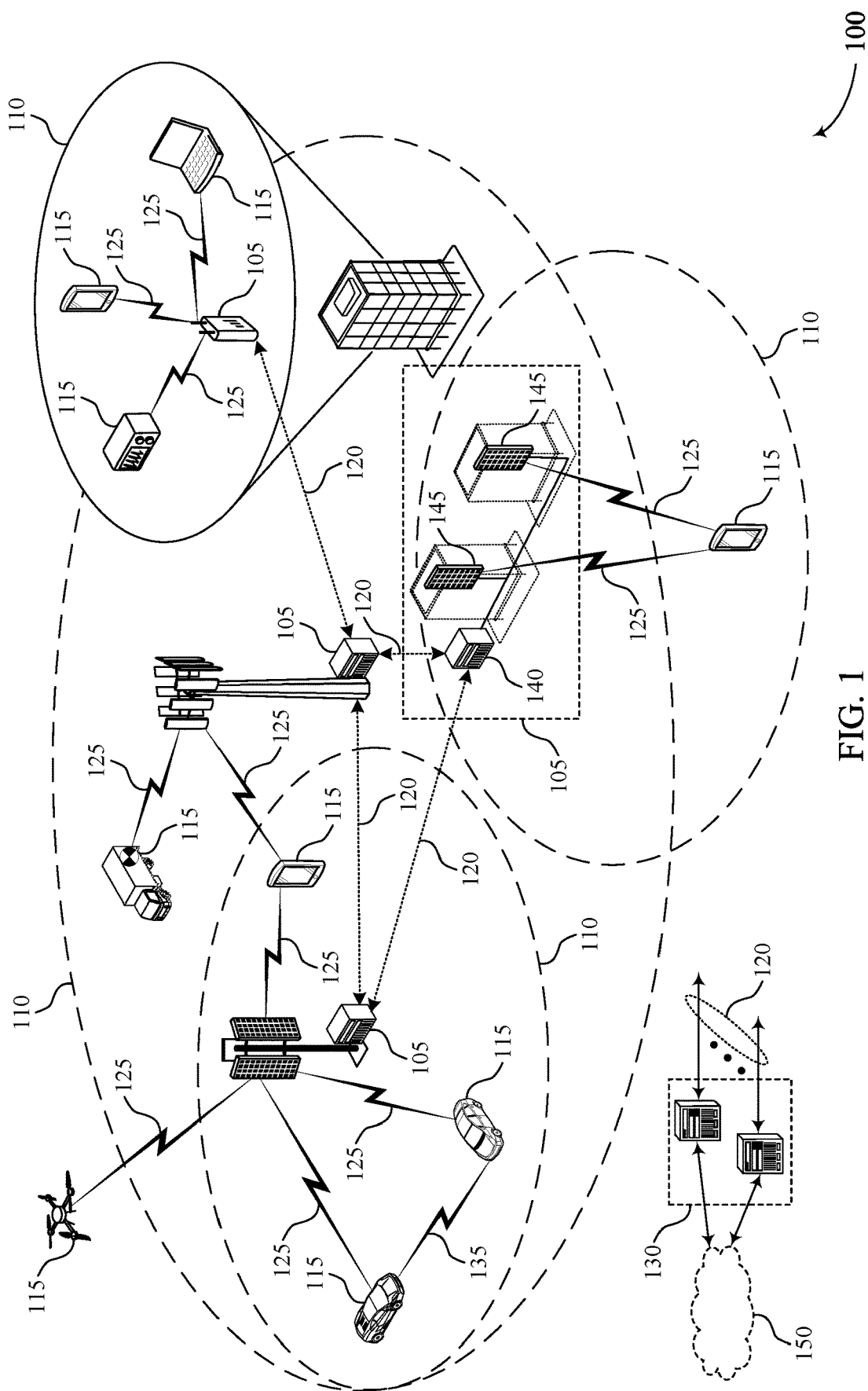
FIG. 1 illustrates an example of a system for wireless communications that supports frequency division multiplexing (FDM) mapping of transmission configuration indicator (TCI) states to a control channel in accordance with aspects of the present disclosure.

As demand for communication resources increases due to an increasing number of wireless devices communicating over the available spectrum, techniques to efficiently and reliably increase throughput are desirable. In some cases, the overall reliability of a wireless communications system may depend on the reliability of a number of different communication channels. For example, a wireless device, such as a user equipment (UE), may receive downlink data transmissions from a base station over a downlink data channel (e.g., a physical downlink shared channel (PDSCH)) and downlink control transmissions over a downlink control channel (e.g., a physical downlink control channel (PDCCH)) and the overall system reliability may depend on the reliability of both channels. In some cases, the reliability of the channels may be associated with (e.g., positively correlated with) a diversity of the channels. Accordingly, increasing the diversity of a channel may increase the reliability of the channel. In some cases, the diversity of a channel may be associated with a number or quantity of transmission configuration indicator (TCI) states associated with the channel. For instance, a downlink data channel may be configured for multi-TCI state operation such that different resources (e.g., spatial layers, resource blocks (RBs), orthogonal frequency division multiplexing (OFDM) symbols, or OFDM slots) associated with the downlink data channel may be associated with different TCI states. In some cases, downlink control information (DCI) may include a TCI field indicating the number of TCI states associated with the downlink data channel. The downlink data channel may feature enhanced diversity and reliability based on being associated with the number of TCI states.

In some deployments, however, a downlink control channel (e.g., resources associated with the downlink control channel) may be limited to a single TCI state without a mechanism for assigning the downlink control channel with multiple TCI states. As such, the downlink control channel may be associated with relatively lower transmission diversity and may be less reliable than the downlink data channel that is associated with multiple TCI states, which may limit the achievable efficiency and reliability of the overall wireless communications system (as the efficiency and reliability may depend on both the downlink data channel and the downlink control channel).

Various implementations of the present disclosure relate generally to associating (e.g., defining or assigning) multiple TCI states to a downlink control channel based on an FDM mapping. For example, some frequency resources associated with the downlink control channel may be associated with a first TCI state while other frequency resources of the downlink control channel may be associated a second TCI state. For example, a downlink control channel may be associated with a control resource set (CORESET) and the CORESET (e.g., resources of the CORESET) may be associated with the multiple TCI states. In some cases, the CORESET may include a number of control channel elements (CCEs), and each CCE may be associated with a number of resource element group (REG) bundles (e.g., based on a CCE-to-REG mapping). Further, each REG bundle may include a number of REGs (e.g., a number of consecutive REGs). In some aspects, an REG may include one RB in one OFDM symbol.

In some implementations of the techniques described herein, the CORESET may be configured such that different resources of the CORESET (e.g., CCEs, REG bundles, super-bundles of REG bundles, or RBs) are associated with a TCI state from a set of TCI states. In some examples, the resources of the CORESET may be associated with the set of TCI states on a per-CORESET basis, such that a CORESET may include resources associated with the set of TCI states. In some aspects, the mapping between the resources of the CORESET and the set of TCI states may be similar or the same for each CORESET that the UE may monitor. In some cases, the CORESET may include a number of subsets of contiguous RBs, and the mapping between resources of the CORESET and the set of TCI states may be similar or the same within each subset of contiguous RBs of the CORESET. Accordingly, each subset of contiguous RBs of the CORESET may include resources associated with the set of TCI states. Additionally or alternatively, resources of the CORESET may be associated with the set of TCI states on a per-CCE basis, such that each CCE includes resources associated with the set of TCI states. For instance, the mapping between resources and TCI states may be similar or the same within each CCE.

Additionally or alternatively, the resources of the CORESET may be associated with multiple TCI states on a per-downlink control channel candidate basis. For example, the mapping between resources of the CORESET and TCI states may be similar or the same within a number of CCEs (e.g., all CCEs) associated with a downlink control channel candidate. Additionally or alternatively, a mapping between resources and TCI states may be similar or the same within sets of REG bundles. For instance, a super-bundle may include a number of REG bundles and the super-bundle may include resources associated with multiple TCI states. In some aspects, the mapping between resources of the CORESET and TCI states may be similar or the same within each super-bundle.

Particular implementations of the subject matter described in this disclosure can be implemented to realize one or more of the following potential advantages. In some implementations, the described techniques can be used to improve the diversity and reliability of a downlink control channel. For example, configuring (e.g., defining or assigning) multiple TCI states for a CORESET associated with a downlink control channel may provide a UE with additional quasi-colocation information, such as additional knowledge of quasi-colocated (QCL) reference signals. This may enable the UE to improve channel estimation for the downlink control channel and enhance the ability of the UE to accurately manage different reception beams used for receiving the downlink control channel. As such, the UE may be more likely to successfully receive and decode the downlink control channel, which may result in increased reliability of the downlink control channel and improve overall system efficiency. Further, by increasing the reliability of the downlink control channel, the UE may perform fewer reception attempts of the downlink control channel. By reducing the number of reception attempts, the UE may additionally experience increased power savings associated with fewer monitoring occasions and decoding operations.

Aspects of the disclosure are initially described in the context of wireless communications systems. Additionally, aspects of the disclosure are described in the context of multi-TCI state configurations and a multi-TCI state interleaver configuration. Aspects of the disclosure are further illustrated by and described with reference to apparatus diagrams, system diagrams, and flowcharts that relate to frequency division multiplexing mapping of transmission configuration indicator states to a control channel.

FIG. 1 illustrates an example of a wireless communications system 100 that supports frequency division multiplexing mapping of transmission configuration indicator states to a control channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1. Components within a wireless communication system may be coupled (for example, operatively, communicatively, functionally, electronically, or electrically) to each other.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, resources associated with a downlink control channel (e.g., a PDCCH) may be associated with multiple TCI states, and the mapping between the resources and the different TCI states may be based on an FDM mapping. For example, a base station 105 may assign different frequency resources of a CORESET to different TCI states, and may transmit signaling (e.g., control signaling, RRC signaling, or other configuration signaling), indicating to a UE 115 that the CORESET is associated with multiple TCI states. In some examples, the base station 105 may transmit signaling indicating a mapping between frequency resources of the CORESET and TCI states. Such signaling may include explicit mappings (e.g., bit mappings), partial mappings, or implicit mappings such that the UE 115 may identify the mapping between the resources of the CORESET and the TCI states. The UE 115 may decode the PDCCH based on the FDM mapping.

Such techniques may be used to improve the diversity and reliability of a downlink control channel. For example, configuring (e.g., defining or assigning) multiple TCI states for a CORESET associated with a downlink control channel may provide a UE 115 with additional quasi-colocation information, such as additional knowledge of QCL reference signals. This may enable the UE 115 to improve channel estimation for the downlink control channel and enhance the ability of the UE 115 to accurately manage different reception beams used for receiving the downlink control channel. As such, the UE 115 may be more likely to successfully receive and decode the downlink control channel, which may result in increased reliability of the downlink control channel and improve overall efficiency of the wireless communications system 100.

Figure 2:
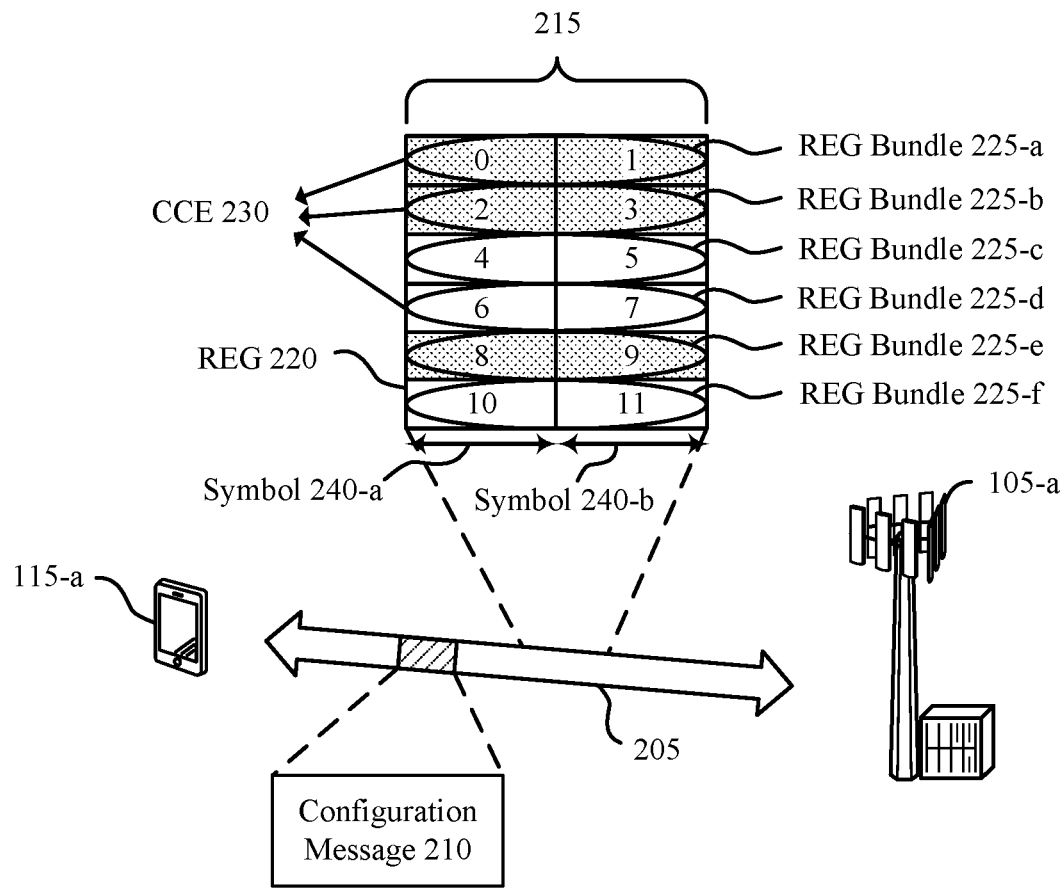
FIG. 2 illustrates an example of a wireless communications system 200 that supports FDM mapping of TCI states to a control channel in accordance with aspects of the present disclosure.

FIG. 2 illustrates an example of a wireless communications system 200 that supports FDM mapping of TCI states to a control channel in accordance with aspects of the present disclosure. In some examples, the wireless communications system 200 may implement aspects of the wireless communications system 100. The wireless communications system 200 may include a UE 115-a and a base station 105-a, which may be examples of the corresponding wireless devices described herein, including with reference to FIG. 1. The base station 105-a may transmit over a control channel (e.g., over a downlink control channel, such as a PDCCH) to the UE 115-a over a communication link 205. In some examples, the wireless communications system 200 may be configured to support downlink control channels associated with multiple TCI states 235.

For example, a base station 105-a may transmit over a downlink control channel and the UE 115-a may likewise monitor the downlink control channel at one or more resource locations based on an operating bandwidth part (BWP) of the UE 115-a. In other words, the UE 115-a may monitor for one or more downlink control channel candidates (e.g., occasions in which the UE 115-a may receive the downlink control channel) based on the BWP in which the UE 115-a operates (e.g., the BWP that the UE 115-a determines to monitor for downlink transmissions). In some cases, the UE 115-a may monitor for downlink control channel candidates in a number (e.g., 3 or 5) of CORESETs, such as the CORESET 215, based on the operating BWP of the UE 115-a. The CORESET 215 may be associated with one or more properties and the UE 115-a may receive downlink control channel candidates in the CORESET 215 based on identifying the one or more properties of CORESET 215. In some cases, a downlink control channel within the CORESET 215 may be associated with a repetition pattern. In such cases, the repetition pattern of the downlink control channel may be associated with a TCI state 235. Additionally, a DCI (e.g., a DCI including scheduling information for a data channel) may be located within the CORESET 215 (e.g., the UE 115-a may receive the DCI within the CORESET 215) and, in some cases, the DCI may include a TCI state field (e.g., which may indicate one or more TCI states 235 associated with the data channel). The UE 115-a may determine whether the DCI includes a TCI state field based on an indication associated with the CORESET 215 (e.g., as defined by a TCI-PresentinDCI field associated with the CORESET 215).

The CORESET 215 may also include a number of RBs (e.g., a frequency domain unit of the CORESET 215) and a number of symbols 240 (e.g., a time domain unit of the CORESET 215). The CORESET 215 may also include a number of REGs 220, and each REG 220 may correspond to one RB in one symbol 240. In some cases, REGs 220 may be numbered in a time-first, frequency-second manner. Accordingly, two consecutively numbered REGs 220 may be located in two different symbols 240. For example, REG 220 "0" may be located in symbol 240-a and REG 220 "1" may be located in symbol 240-b.

As shown in FIG. 2, the CORESET 215 may include 12 REGs 220. However, any number of REGs 220 may be included within the CORESET 215 without departing from the scope of the present disclosure. Additionally, although FIG. 2 illustrates the CORESET 215 with 2 symbols 240, the CORESET 215 may include any number of symbols 240 (e.g., the CORESET 215 may include 1, 2, or 3 symbols 240) without departing from the scope of the present disclosure. In some cases, the CORESET 215 may be associated with a CCE-to-REG mapping type (e.g., interleaved CCE-to-REG mapping or non-interleaved CCE-to-REG mapping). In some aspects, a CCE 230 of the CORESET 215 may include a number of REGs 220 (e.g., a CCE 230 may include 6 REGs 220).

A number L of consecutive REGs 220 of the CORESET 215 may be grouped together in REG bundles 225 such that L may also be referred to as the REG bundle size. In some examples (e.g., for non-interleaved CCE-to-REG mapping), the REG bundle size may be constant (e.g., an REG bundle 225 may include 6 REGs 220). Accordingly, in such examples, one CCE may correspond to one REG bundle.

Alternatively (e.g., for interleaved CCE-to-REG mapping), the REG bundle size may be configured. In some cases, the REG bundle size may be configured for the CORESET 215 based on the number of symbols 240 included in the CORESET 215. For instance, in examples in which the CORESET 215 includes 1 or 2 symbols 240, the REG bundle size may be 2 or 6 (e.g., an REG bundle 225 may include 2 or 6 REGs 220). Alternatively, in examples in which the CORESET 215 includes 3 symbols 240, the REG bundle size may be 3 or 6 (e.g., an REG bundle 225 may include 3 or 6 REGs 220). In some cases, the mapping between a CCE 230 and one or more REG bundles 225 may be based on the REG bundle size and an interleaving function. For example, a CCE 230 of the CORESET 215 may be mapped to a number of REG bundles 225 (e.g., interleaved REG bundles 225) based on the REG bundle size L associated with CORESET 215 and the interleaving function.

The CORESET 215 may also be associated with a CORESETPoolIndex field, which may have a value of 0 or 1. In some cases, the value of the CORESETPoolIndex field may be based on (e.g., equivalent to) a transmission reception point (TRP) ID used for other communications. Additionally, the CORESET 215 may be associated with a scrambling ID that may be used for performing channel estimation from a downlink control channel demodulation reference signal (DMRS). In some examples, the scrambling ID of the CORESET 215 may be used to decode a set of coded bits associated with content of a DCI received in the CORESET 215.

The UE 115-a may be configured with a number (e.g., 10) of search space sets (SSSS) associated with the operating BWP of the UE 115-a and the UE 115-a may monitor for downlink control channel candidates based on monitoring one or more SSSs. In some cases, each SSS may be associated with a CORESET 215 and a number of monitoring occasions for downlink control channel candidates associated with the CORESET 215 (e.g., each SSS may correspond to the resource locations in time where the UE 115-a may attempt to receive a downlink control channel within a CORESET 215). The 115-a may identify a SSS of the number of configured SSSs to use for monitoring downlink control channel candidates within a CORESET 215. In some cases, the SSS may be configured with a number of downlink control channel candidates for an aggregation level. In some aspects, a number of CCEs 230 may be associated with a downlink control channel candidate, and the number of CCEs 230 associated with the downlink control channel candidate may be based on the aggregation level configured for the downlink control channel candidate.

The SSS may indicate the resource locations in time when the UE 115-a may receive a downlink control channel based on a number of properties associated with the SSS. For example, the SSS may be associated with at least one of a slot periodicity and offset (e.g., defined by a monitoringSlotPeriodicityAndOffset field associated with the SSS), a number of slots within a period of the SSS (e.g., defined by a duration field associated with the SSS), a monitoring pattern within a slot (e.g., defined by a monitoringSymbolsWithinSlot field associated with the SSS), or any combination thereof. In some cases, the SSS may be associated with a SSS type (e.g., a UE-specific SSS or a common SSS), which may correspond to a type of downlink control channel that the UE 115-a may receive (e.g., a UE-specific downlink control channel or a common downlink control channel) and one or more DCI formats that the UE 115-a may monitor.

As described herein, the UE 115-a may monitor for one or more downlink control channel candidates in a SSS associated with the CORESET 215 based on the operating BWP and SSS of the UE 115-a. In some implementations of the present disclosure, the base station 105-a may transmit a configuration message 210 to the UE 115-a over a communication link 205 indicating that the CORESET 215 is associated with a set of TCI states 235 (e.g., multiple TCI states 235). The communication link 205 may include a PDCCH, a BCCH, a BCH, or any other suitable communication channel for downlink control transmissions. In some examples, the base station 105-a may transmit the configuration message 210 to the UE 115-a via higher layer control signaling (e.g., radio resource control (RRC) signaling).

In some cases, a TCI state 235 may indicate one or more reference signals to enable the UE 115-a to identify a set of QCL properties associated with the CORESET 215. In some implementations, multiple TCI states 235 may indicate additional reference signals, enabling the UE 115-a to identify different (e.g., a variety of) QCL properties that may enhance the diversity and reliability of a communication channel associated with the multiple TCI states 235. For example, a downlink control channel may be associated with a number of different QCL types, such as QCL types A, B, C, and D. In some cases (e.g., in cases in which the UE 115-a communicates over FR2 radio frequency spectrum bands), the UE 115-a may use QCL type D to manage reception beams and QCL types A, B, and C may correspond to additional QCL relations. For example, the UE 115-a may use a number of TCI states 235 to identify that one or more reference signals, such as a channel state information reference signal (CSI-RS), are QCL with the CORESET 215 associated with the downlink control channel. Accordingly, the UE 115-a may manage reception beams for receiving the downlink control channel based on the spatial relationship between the one or more reference signals and the CORESET 215. In some aspects, the CORESET 215 may be associated with multiple TCI states based on communications using or otherwise involving multiple TRPs or communications using or otherwise involving a single TRP with multiple beams.

In some examples, the configuration message 210 may include an indication of a precoder granularity for the CORESET 215. For instance, in some examples, the configuration message 210 may indicate that the precoder granularity for the CORESET 215 is configured for narrowband channel estimation (e.g., the precoder granularity is defined as sameAsREG-bundle). In such examples in which the precoder granularity of the CORESET 215 is configured for narrowband channel estimation, the UE 115-a may assume that REGs 220 included in an REG bundle 225 of the CORESET 215 are associated with a same precoding. Similarly, the UE 115-a may assume that REGs 220 included in different REG bundles 225 of the CORESET 215 are associated with different precodings.

Alternatively, in some other examples, the configuration message 210 may indicate that the precoder granularity for the CORESET 215 is configured for wideband channel estimation (e.g., the precoder granularity is defined as all-ContiguousRBs). In such examples in which the precoder granularity of the CORESET 215 is configured for wideband channel estimation, the UE 115-a may assume that each contiguous subset of RBs of the CORESET 215 are associated with a same precoding. Additionally, in such examples in which the CORESET 215 has a precoder granularity configured for wideband channel estimation, the UE 115-a may expect to be configured with a set of RBs of the CORESET 215 including no more than a threshold number of subsets of contiguous RBs. For example, the UE 115-a may expect to be configured with a set of RBs of the CORESET 215 that includes four or fewer subsets of contiguous RBs. In some cases, the UE 115-a may perform channel estimation of a downlink control channel over a frequency unit based on the precoder granularity.

In some implementations, the UE 115-a may identify an association (e.g., based on an FDM mapping) between the resources of the CORESET 215 and the set of TCI states 235 based on receiving the configuration message 210. In some examples, the UE 115-a may identify that the association is based on a fixed rule that defines a mapping between the resources of the CORESET 215 and the set of TCI states 235. For example, the fixed rule may be preconfigured at the UE 115-a and the configuration message 210 may indicate that the UE 115-a is to employ the fixed rule for decoding a downlink control channel associated with the CORESET 215. In some related aspects, the UE 115-a may be preconfigured with a number of fixed rules and the UE 115-a, using the configuration message 210, may identify a fixed rule from the number of fixed rules for decoding a downlink control channel associated with CORESET 215. Additionally or alternatively, the UE 115-a may identify the association based on a rule signaled to the UE 115-a from the base station 105-a. For example, the base station 105-a may transmit the configuration message 210 to the UE 115-a including an indication of the association between the resources of the CORESET 215 and the set of TCI states 235. For instance, the base station 105-a may convey an indication of the association between the resources of the CORESET 215 and the set of TCI states 235 via the configuration message 210.

In some examples of the techniques described herein, the association between the resources of CORSET 215 and the set of TCI states 235 may be based on an FDM mapping. For example, each TCI state 235 of the set of TCI states 235 may be mapped to a frequency resource of the CORESET 215. In some implementations, the association between the resources of CORESET 215 and the set of TCI states 235 may be based on the precoder granularity indicated by the configuration message 210.

In some implementations, the UE 115-a may identify that the set of TCI states 235 may be mapped to the REG bundles 225 of the CORESET 215. For example, the UE 115-a may identify, based on receiving configuration message 210 and the FDM mapping, that REG bundle 225-a, REG bundle 225-b, and REG bundle 225-e are associated with TCI state 235-a and that REG bundle 225-c, REG bundle 225-d, and REG bundle 225-f are associated with TCI state 235-b. Further, the mapping of TCI states 235 to REG bundles 225 may be on a per-CORESET 215 basis, a per-downlink control channel basis, a per-CCE 230 basis, or a per-super REG bundle basis, as described in more detail with reference to FIGS. 3-6.

Figure 3:
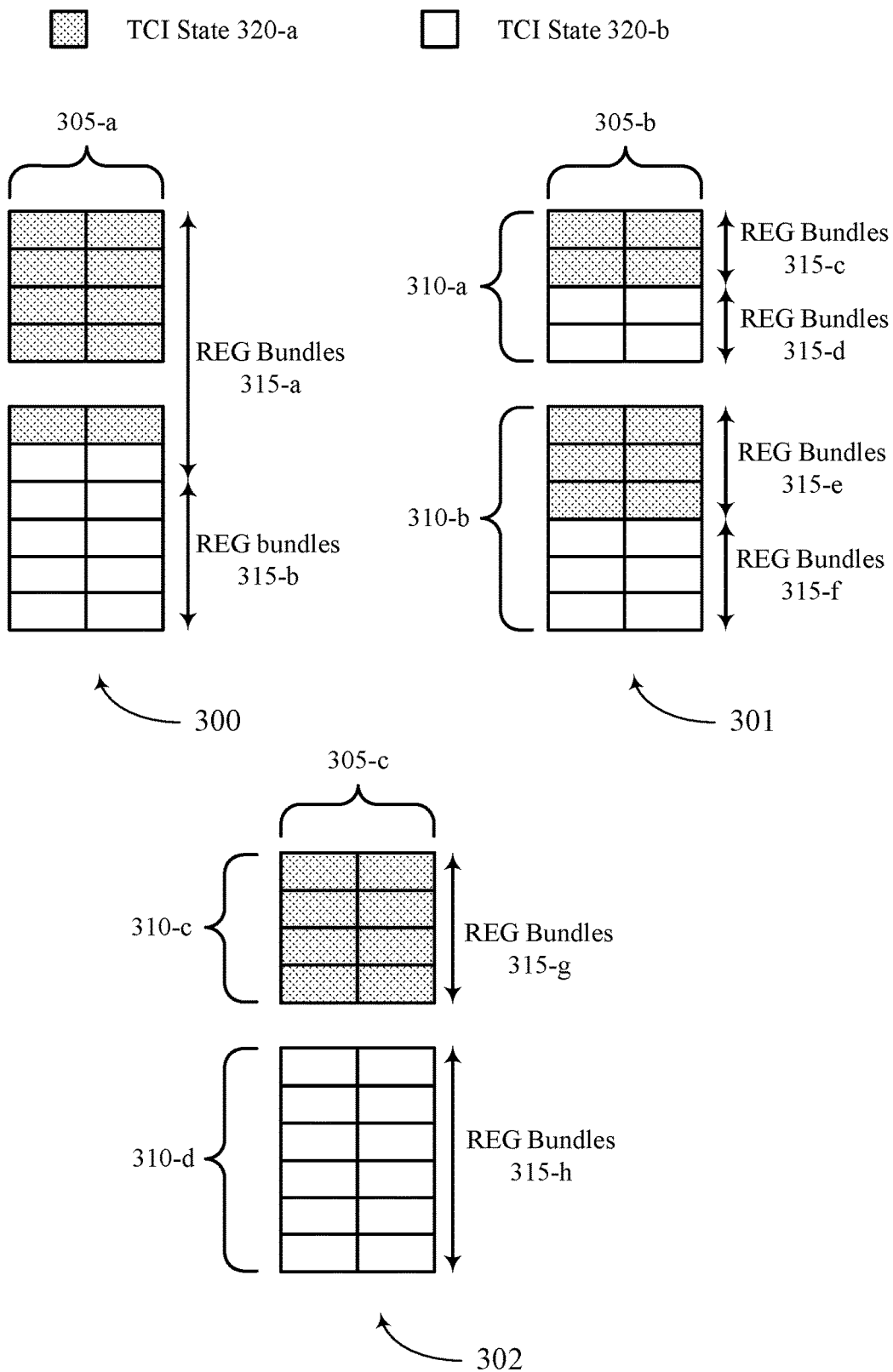
FIG. 3 illustrates an example of multi-TCI state configurations that support FDM mapping of TCI states to a control channel in accordance with aspects of the present disclosure.

FIG. 3 illustrates examples of multi-TCI state configurations 300, 301, and 302 that support FDM mapping of TCI states to a control channel in accordance with aspects of the present disclosure. In some examples, multi-TCI state configurations 300, 301, and 302 may be implemented to realize aspects of the wireless communications system 100 or the wireless communications system 200. In some examples, the multi-TCI state configurations 300, 301, and 302 may be configured for communications between a base station 105 and a UE 115. For example, multi-TCI state configurations 300, 301, and 302 may enable the configuration of a downlink control channel with multiple TCI states 320. The multi-TCI state configurations 300, 301, and 302 may correspond to an association between the resources of a CORESET 305 in which a UE 115 may attempt to receive the downlink control channel and the multiple TCI states 320 that the downlink control channel may be configured with.

In some examples of the techniques described herein, a UE 115 may receive a configuration message indicating that a CORESET 305-a may be associated with a set of TCI states 320, and the UE 115 may identify an association (e.g., a multi-TCI state configuration 300) between the resources of the CORESET 305-a and the set of TCI states 320 based on the configuration message and an FDM mapping. In some aspects, the configuration message may indicate that a precoder granularity for the CORESET 305-a is configured for wideband channel estimation or narrowband channel estimation. In some implementations, the multi-TCI state configuration 300 may associate resources of the CORESET 305-a with multiple TCI states 320 on a per-CORESET basis.

For example, the UE may identify, based on the multi-TCI state configuration 300, that a first set of REG bundles 315-a of the CORESET 305-a are associated with a TCI state 320-a and that a second set of REG bundles 315-b of the CORESET 305-a are associated with a TCI state 320-b. In some implementations, the first set of REG bundles 315-a may be a first number of REG bundles 315 of the total number of REG bundles 315 of the CORESET 305-a. In other words, the first set of REG bundles 315-a may be the first half of the total number of REG bundles 315 of the CORESET 305-a. For example, the first set of REG bundles 315-a may be defined by a ceiling function of the total number of REG bundles 315 of the CORESET 305-a divided by two. In some examples, the second set of REG bundles 315-b may be the remaining REG bundles 315 after the first set of REG bundles 315-a. For instance, the second set of REG bundles 315-b may be defined based on a difference between the total number of REG bundles 315 of the CORESET 305-a and the first set of REG bundles 315-a.

In some implementations, the UE 115 may identify the multi-TCI state configuration 300 based on a fixed rule at the UE 115. For example, the UE 115 may be configured with a fixed rule associated with the multi-TCI state configuration 300. Additionally or alternatively, the UE 115 may receiving signaling (e.g., RRC signaling), such as the configuration message, from a base station 105 indicating the multi-TCI state configuration 300. In some examples, the UE 115 may be configured with a set of fixed rules including the fixed rule associated with the multi-TCI state configuration 300. In such examples, the UE 115 may select a fixed rule based on the configuration message received from the base station 105. In some other examples, the UE 115 may identify the multi-TCI state configuration 300 based on receiving signaling including information pertaining to or otherwise associated with the multi-TCI state configuration 300. For example, the UE 115 may receive control signaling (e.g., RRC signaling), such as the configuration message, indicating that a first set of REG bundles 315-a may be a first number (e.g., a first half) of REG bundles 315 of a total number of REG bundles 315 of the CORESET 305-a. In such examples, the UE 115 may determine the second set of REG bundles 315-b based on a difference between the total number of REG bundles 315 of the CORESET 305-a and the first set of REG bundles 315-a. Alternatively, the control signaling (e.g., the configuration message) may provide an indication for the first set of REG bundles 315 and the second set of REG bundles 315 within each subset 310 of the CORESET 305-b.

In some examples, the UE 115 may receive a configuration message indicating that a CORESET 305-b is associated with a set of TCI states 320. Accordingly, the UE 115 may identify an association (e.g., a multi-TCI state configuration 301) between the resources of the CORESET 305-b and the set of TCI states 320 based on the configuration message and an FDM mapping. In some aspects, the CORESET 305-b may include a number of subsets 310 (e.g., subsets of contiguous RBs), including a subset 310-a and a subset 310-b. In some cases, the configuration message may indicate that a precoder granularity for the CORESET 305-a is configured for wideband channel estimation. In some implementations, the multi-TCI state configuration 301 may associate resources of the CORESET 305-b with multiple TCI states 320 on a per-subset basis. For example, the multi-TCI state configuration 301 may define a mapping (e.g., a rule) between resources of the CORESET 305-b and the set of TCI states 320 for each subset 310 of the CORESET 305-b.

For example, the UE 115 may identify, based on the multi-TCI state configuration 301, that a first set of REG bundles 315-c within a subset 310-a of the CORESET 305-b are associated with the TCI state 320-a and that a second set of REG bundles 315-d within a subset 310-a of the CORESET 305-b are associated with the TCI state 320-b. In some implementations, the UE 115 may identify that the first set of REG bundles 315-c may be a first number of REG bundles 315 of the total number of REG bundles 315 with the subset 310-*a* of the CORESET 305-*b*. In some specific implementations, the first set of REG bundles 315-*c* may be the first half of the total number of REG bundles 315 within the subset 310-*a*. For instance, the first set of REG bundles 315-*c* may be defined by a ceiling function of the total number of REG bundles 315 divided by two within the subset 310-*a* of the CORESET 305-*b*. In some examples, the UE 115 may determine that the second set of REG bundles 315-*d* within the subset 310-*a* of the CORESET 305-*b* may be the remaining number of REG bundles 315 within the subset 310-*a*. For example, the second set of REG bundles 315-*d* of the CORESET 305-*b* may be defined by the difference between the total number of REG bundles 315 within the subset 310-*a* of the CORESET 305-*b* and the first set of REG bundles 315-*c*.

Likewise, for a subset 310-*b*, the UE 115 may identify that a first set of REG bundles 315-*e* within the subset 310-*b* are associated with the TCI state 320-*a* and that a second set of REG bundles 315-*f* within the subset 310-*b* are associated with the TCI state 320-*b*. In some examples, the first set of REG bundles 315-*e* and the second set of REG bundles 315-*f* within the subset 310-*b* may be defined in a similar manner to the first set of REG bundles 315-*c* and the second set of REG bundles 315-*d* within the subset 310-*a*. Accordingly, a first set of REG bundles 315 (e.g., the REG bundles 315-*c* and REG bundles 315-*e*) may be defined by a first number of REG bundles 315 within each subset 310 of the CORESET 305-*b* and a second set of REG bundles 315 (e.g., the REG bundles 315-*d* and REG bundles 315-*f*) may be defined by a difference between the total number of REG bundles 315 within each subset 310 of the CORESET 305-*b* and the first set of REG bundles 315 within each subset 310 of the CORESET 305-*b*. As such, the multi-TCI state configuration 301 may define a same or similar mapping between TCI states 320 and resources of the CORESET 305-*b* for each subset 310 of the CORESET 305-*b*. In some other implementations, the mapping between TCI states 320 and resources of the CORESET 305-*b* may be different for each of the subsets 310 of the CORESET 305-*b*.

In some examples, the UE 115 may identify the multi-TCI state configuration 301 based on a fixed rule at the UE 115 (e.g., the multi-TCI state configuration 301 may be preconfigured at the UE 115). In some other examples, the UE 115 may identify the multi-TCI state configuration 301 based on receiving control signaling (e.g., RRC signaling) from a base station 105 indicating that the UE 115 may use the multi-TCI state configuration 301 to decode a downlink control channel in the CORESET 305-*b*. In some aspects, the control signaling may provide an indication for a first set of REG bundles 315 associated with a first TCI state 320 (e.g., the TCI state 320-*a*) and the UE may determine the second set of REG bundles associated with a second TCI state 320 (e.g., the TCI state 320-*b*) based on the remaining number of REG bundles 315 within each subset 310 of the CORESET 305-*b* after the first set of REG bundles 315. In some alternative aspects, the control signaling may provide an indication for the first set of REG bundles 315 and the second set of REG bundles 315 within each subset 310 of the CORESET 305-*b*. In some examples, the control signaling may indicate different mappings between resources of a subset 310 and the set of TCI states 320 for each subset 310 of the CORESET 305-*b*. In some other examples, the control signaling may indicate a single mapping between resources of a subset 310 and the set of TCI states 320 that may be applicable to (e.g., consistent between) each subset 310 of the CORESET 305-*b*.

In some implementations, the UE 115 may identify that each subset 310 (e.g., each subset of contiguous RBs) of a CORESET 305 may be associated with a single TCI state 320. For example, the UE 115 may identify that the CORESET 305-*c* is associated with multiple TCI states 320 based on the multi-TCI state configuration 302. The UE 115, using the multi-TCI state configuration 302, may identify that a subset 310-*c* of the CORESET 305-*c* is associated with TCI state 320-*a* and that a subset 310-*d* of the CORESET 305-*c* is associated with the TCI state 320-*b*. For example, the CORESET 305-*c* may be configured such that REG bundles 315 (e.g., all REG bundles 315) within a subset 310 of the CORESET 305-*c* are associated with the same TCI state 320, while REG bundles 315 within different subsets 310 of the CORESET 305-*c* may be associated with different TCI states 320. For instance, the REG bundles 315-*g* within the subset 310-*c* may be associated with the TCI state 320-*a*, while the REG bundles 315-*h* within the subset 310-*d* may be associated with the TCI state 320-*b*.

In some examples, the CORESET 305-*c* may be associated with a number of subsets 310 and a first half of the number of subsets 310 may be associated with a first TCI state (e.g., the TCI state 320-*a*) and the second half of the number of subsets 310 may be associated with a second TCI state (e.g., the TCI state 320-*b*). In some other examples, different patterns of the mapping between subsets 310 and TCI states 320 may be configured. For example, even-numbered subsets 310 may be associated with a first TCI state 320 and odd-numbered subsets 310 may be associated with a second TCI state 320, among other examples.

The UE 115 may receive and decode a downlink control channel in a CORESET 305 based on the association between the resources (e.g., the REG bundles 315) of the CORSET 305 and the set of TCI states 320. Based on the techniques described herein, the UE 115 may have a greater likelihood of successfully decoding (e.g., blind decoding) the downlink control channel based on the association of the downlink control channel with multiple TCI states 320. For example, a downlink control channel associated with multiple TCI states 320 may feature greater transmission diversity and, therefore, may be more reliable than a downlink control channel associated with a single TCI state.

Figure 4:
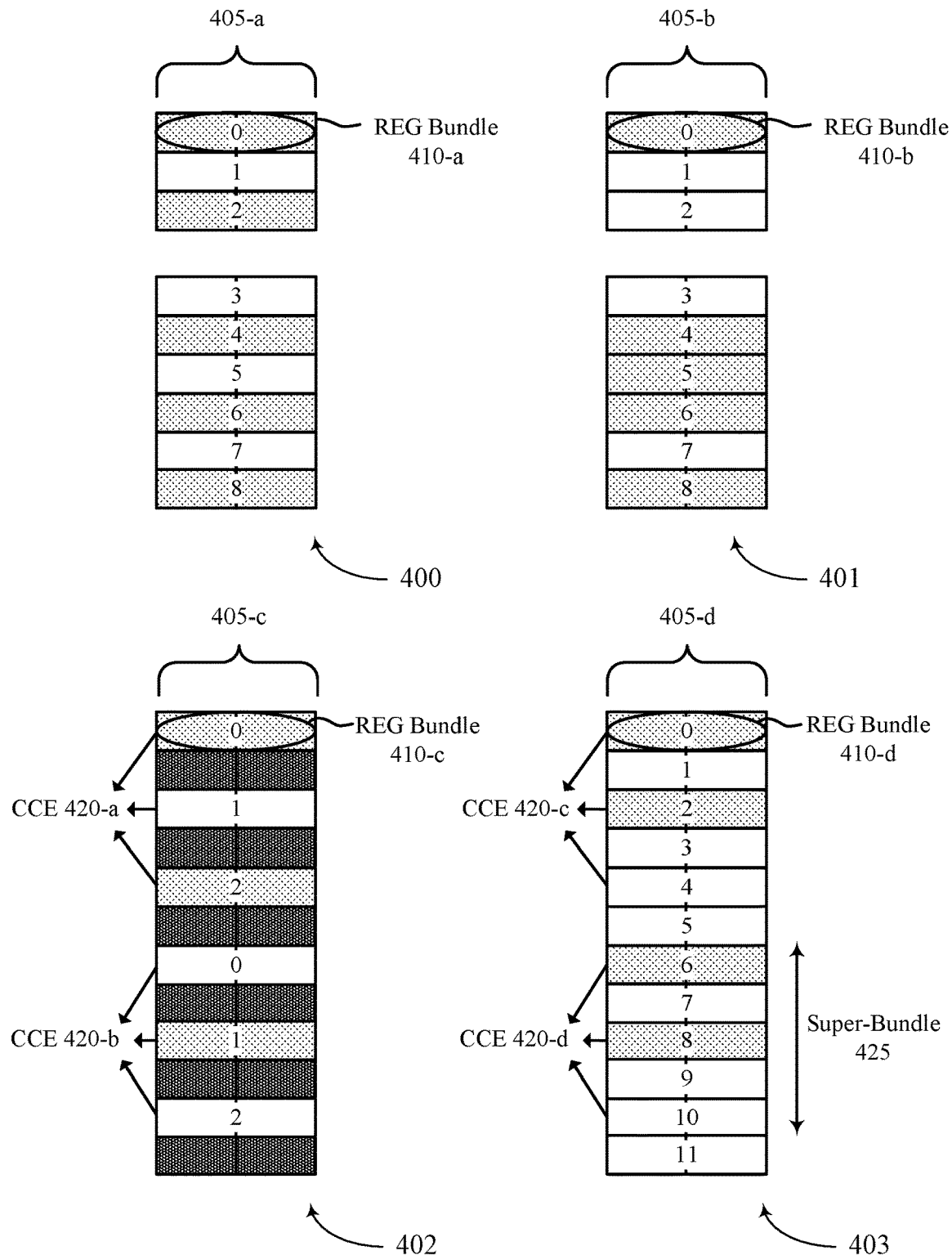
FIG. 4 illustrates an example of multi-TCI state configurations that support FDM mapping of TCI states to a control channel in accordance with aspects of the present disclosure.

FIG. 4 illustrates examples of multi-TCI state configuration 400, 401, 402, and 403 that support FDM mapping of TCI states to a control channel in accordance with aspects of the present disclosure. In some examples, the multi-TCI state configuration 400, 401, 402, and 403 may implement aspects of the wireless communications system 100 or the wireless communications system 200.

In some examples, the multi-TCI state configuration 400, 401, 402, and 403 may be configured for communications between a base station 105 and a UE 115. For example, the multi-TCI state configuration 400, 401, 402, and 403 may enable the configuration of a downlink control channel with multiple TCI states 415. In some aspects, the multi-TCI state configuration 400, 401, 402, and 403 may correspond to an association between the resources of a CORESET 405 in which a UE 115 may attempt to receive the downlink control channel and the multiple TCI states 415 with which the downlink control channel may be configured.

In some examples, the UE 115 may receive a configuration message from the base station 105 indicating that a precoder granularity for a CORESET 405-*a* is configured as narrowband channel estimation (e.g., the precoder granularity may be configured as sameAsREG-bundle). In some implementations, the UE 115, based on receiving the configuration message and an FDM mapping, may identify an association between the resources (e.g., the REG bundles 410-a) of the CORESET 405-a and a set of TCI states 415 based on the multi-TCI state configuration 400. In some examples, the CORESET 405-a may be configured such that REG bundles 410-a of the CORESET 405-a associated with even indices are associated with a first TCI state 415 (e.g., a TCI state 415-a) and REG bundles 410-a of the CORESET 405-a associated with odd indices are associated with a second TCI state 415 (e.g., a TCI state 415-b). For instance, the REG bundle 410-a "0" may be associated with the TCI state 415-a, the REG bundle 410-a "1" may be associated with the TCI state 415-b, the REG bundle 410-a "2" may be associated with the TCI state 415-a, and so on for each REG bundle 410-a of the CORESET 405-a. In some examples, the multi-TCI state configuration 400 may be configured at the UE 115 (e.g., may be a fixed rule at the UE 115). In some other examples, the multi-TCI state configuration 400 may be signaled to the UE 115.

In some other implementations, the UE 115 may identify, based on the configuration message received from the base station 105 and an FDM mapping, that a CORESET 405-b may be associated with the multi-TCI state configuration 401. For example, the UE 115 may identify, based on the multi-TCI state configuration 401, an association between the resources (e.g., the REG bundles 410-b) of the CORESET 405-b and a set of TCI states 415. In some examples, the base station 105 may transmit the configuration message as control signaling (e.g., RRC signaling) and the configuration message may include an indication of a bitmap (e.g., a bitmap of equal length to the number of REG bundles 410-b of the CORESET 405-b) that the UE 115 may employ in identifying the association between the REG bundles 410-b of the CORESET 405-b and the set of TCI states 415.

The UE 115 may receive the configuration message and use the bitmap to assign a TCI state 415 to each REG bundle 410-b of the CORESET 405-b. In some examples, the bitmap may include an indication of a TCI state 415 for each REG bundle 410-b of the CORESET 405-b based on the index of the REG bundle 410-b. For instance, the bitmap may assign the REG bundle 410-b "0" to the TCI state 415-a, the REG bundle 410-b "1" to the TCI state 415-b, and the REG bundle 410-b "2" to the TCI state 415-b, among other examples.

In some cases, one or more DCIs may be mapped to a number of REG bundles 410 (e.g., DCIs may map to one or more CCEs 420). In such cases, the mapping may be based on the downlink control channel aggregation level and the CCE-to-REG mapping parameters. To maintain transmission diversity and reliability of the downlink control channel, each DCI associated with a CORESET 405 is associated with multiple TCI states 415 for all combinations of aggregation levels and CCE-to-REG mapping parameters. Accordingly, in some examples, the multi-TCI state configuration 402 may be employed to configure a CORESET 405-c with multiple TCI states 415 based on an FDM pattern such that each CCE 420 of the CORESET 405-c is associated with multiple TCI states 415. As such, a DCI mapped to a CCE 420 may likewise be associated with multiple TCI states 415.

In some examples, the multi-TCI state configuration 402 may be associated with a mapping between resources (e.g., REG bundles 410-c) of the CORSET 405-c and a set of TCI states 415 on a per-CCE basis. For example, an REG bundle 410-c of the CORESET 405-c may be assigned a TCI state 415 based on which CCE 420 includes the REG bundle 410-c. In some implementations, the TCI state 415 associated with the REG bundle 410-c may be based on the index of the CCE 420 including the REG bundle 410-c.

For example, within a CCE 420 with an even index, such as a CCE 420-a, the REG bundles 410-c with even indices within the CCE 420-a may be associated with a first TCI state 415 and the REG bundles 410-c with odd indices within the CCE 420-a may be associated with a second TCI state 415. For instance, within the CCE 420-a, the REG bundle 410-c "0" and the REG bundle 410 "2" may be associated with the TCI state 415-a and the REG bundle 410-c "1" may be associated with the TCI state 415-b. Similarly, within a CCE 420 with an odd index, such as a CCE 420-b, the REG bundles 410-c with even indices may be associated with the second TCI state 415 and REG bundles 410-c with odd indices may be associated with the first TCI state 415. For instance, within the CCE 420-b, the REG bundle 410-c "0" and the REG bundle 410-c "2" may be associated with the TCI state 415-b and the REG bundle 410-c "1" may be associated with the TCI state 415-a.

In some additional or alternative examples, the mapping between the resources of the CORESET 405 and the set of TCI states 415 may be made on a per-downlink control channel candidate basis. For example, a downlink control channel candidate may be associated with a number of CCEs 420 (e.g., based on the aggregation level of the downlink control channel) and the number of CCEs 420 may be associated with TCI states 415 based on their association with the downlink control channel candidate. In some examples, the downlink control channel may be associated with the multi-TCI state configuration 403 that may define a mapping between the resources of the downlink control channel candidate and the set of TCI states 415. For example, a CCE 420-c and a CCE 420-d of a CORESET 405-d may be associated with the downlink control channel candidate and may be configured according to the same multi-TCI state configuration 403 (e.g., the downlink control channel candidate may have an aggregation level of 2). In some implementations, the multi-TCI state configuration 403 may apply to CCEs 420 associated with the downlink control channel candidate and, in some examples, may not apply to CCEs 420 not associated with the downlink control channel candidate. For example, the multi-TCI state configuration 403 may associate the first number of REG bundles 410-d of each of the CCE 420-c and the CCE 420-d with the TCI state 415-a and may associate the remainder of the REG bundles 410-d within each of the CCE 420-c and the CCE 420-d to the TCI state 415-b. Additionally, other examples of the multi-TCI state configuration 403 may be employed such that each CCE 420 associated with a downlink control channel candidate is associated with a same mapping between the resources of a CORESET 405 and the set of TCI states 415.

Additionally or alternatively, the UE 115 may be configured with or otherwise identify (e.g., via control signaling) a resource unit of a CORESET 405-d associated with a set of REG bundles 410. For example, the UE 115 may determine a unit of super-bundles 425 (e.g., a super-REG-bundle) including a set of REG bundles 410-d. Accordingly, the UE 115 may identify an association between resources (e.g., REG bundles 410-d) of the CORESET 405-d and the set of TCI states 415 on a per-super-bundle basis. For example, each super-bundle 425 may include a first set of REG bundles 410-d associated with a first TCI state 415 and a second set of REG bundles 410 associated with a second TCI state 415. For instance, within the super-bundle 425, the REG bundle 410-d "6" and the REG bundle 410-d "8" may be associated with the TCI state 415-a and the REG bundle 410-*d* "7", the REG bundle 410-*d* "9", and the REG bundle 410-*d* "10" may be associated with the TCI state 415-*b*. In some implementations employing the unit of a super-bundle 425, the CCE-to-REG mapping may be done in units of super-bundles 425.

Figure 5:
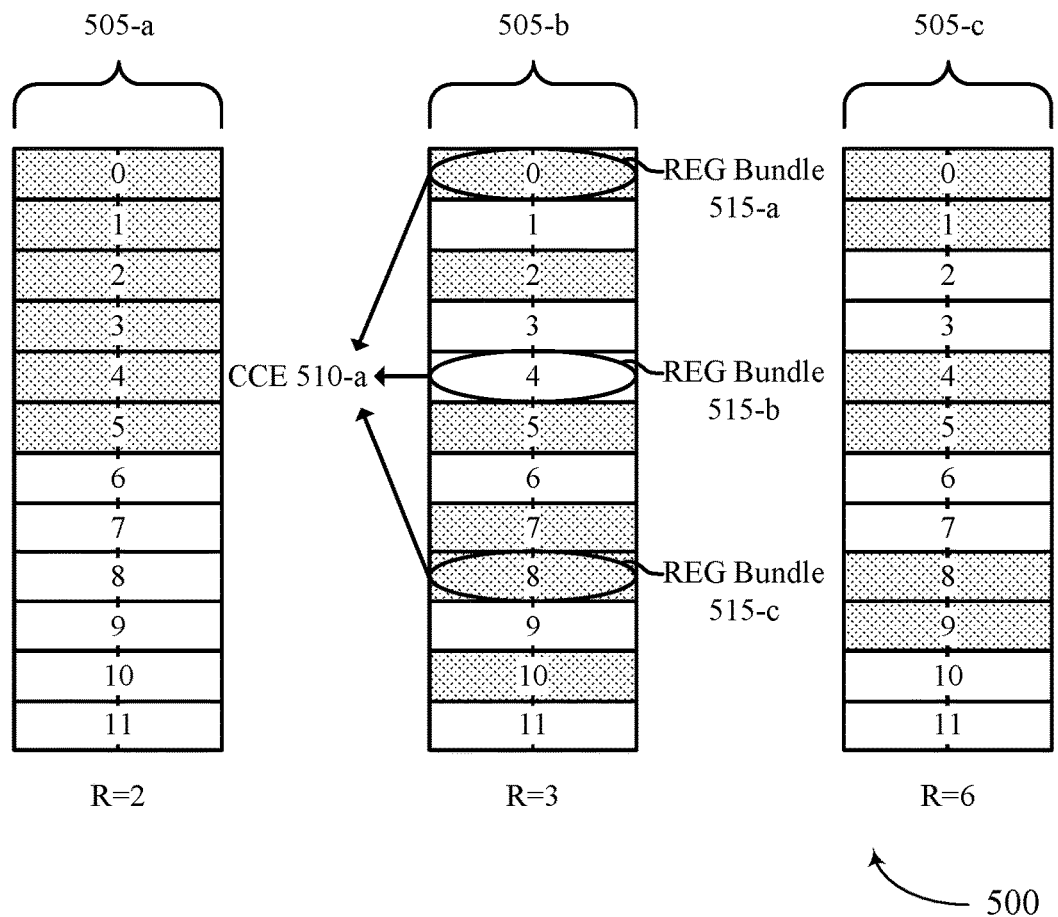
FIG. 5 illustrates an example of a multi-TCI state interleaver configuration that supports FDM mapping of TCI states to a control channel in accordance with aspects of the present disclosure.

FIG. 5 illustrates an example of a multi-TCI state interleaver configuration 500 that supports FDM mapping of TCI states to a control channel in accordance with aspects of the present disclosure. In some examples, the multi-TCI state interleaver configuration 500 may be implemented to realize aspects of the wireless communications system 100 or the wireless communications system 200.

In some examples, a device (e.g., a base station 105 or a UE 115) may use an interleaver table 525 to interleave a number of REG bundles 515 based on an REG bundle size L and an interleaver size R. The interleaver table 525 may be associated with a value of L=2 and may include table entries for R=2, R=3, and R=6. As described herein, L=2 is used for illustrative purposes and different values of L may be used without departing from the scope of the current disclosure. In some examples, the multi-TCI state interleaver configuration 500 may enable transmission diversity and increase reliability of downlink control channels based on configuring a CORESET 505 with multiple TCI states 520. The interleaver table 525 may include example REG bundle 515 interleaving patterns and multi-TCI state mapping for a CORESET 505-*a*, a CORESET 505-*b*, and a CORESET 505-*c*. In some cases, the interleaver table 525 may be configured at a UE 115. In some other cases, the interleaver table 525 may be signaled to the UE 115 via control signaling (e.g., RRC signaling) from a base station 105.

In some implementations, the interleaver table 525 may map a first set of REG bundle indices (e.g., indices i of the interleaver table 525) to a second set of REG bundle indices (e.g., indices $f(i)$ of the interleaver table 525, where $f(\cdot)$ may be the interleaver function). In some examples, the second set of indices $f(i)$ may correspond or relate to a CCE 510 index j and the REG bundle size L as described in Equation 1:

$$\{f(6j/L), f(6j/L+1), \ldots, f(6j/L+6/L-1)\} \quad (1)$$

In some cases, the interleaver function $f(x)$ may be defined by Equation 2:

$$f(x) = (rC + C + n_{shift}) \bmod (N_{REG}^{CORESET}/L)$$

$$x = cR + r$$

$$r = 0, 1, \ldots, R-1$$

$$c = 0, 1, \ldots, C-1$$

$$C = N_{REG}^{CORESET}/(LR) \quad (2)$$

where R is an interleaver size. In some cases, the first set of REG bundle indices may correspond to a non-interleaved numbering (e.g., ordering) of REG bundles 515 of a CORESET 505. In some implementations, the REG bundles 515 may be configured such that the REG bundles 515 are associated with TCI states 520 based on the first set of REG bundle indices of the REG bundles 515. For instance, a first set of REG bundles 515 may be associated with even-numbered indices (e.g., even-numbered indices i of the interleaver table 525) and, accordingly, may be associated with a TCI state 520-*a*. Similarly, a second set of REG bundles 515 may be associated with odd-numbered indices (e.g., odd-numbered indices i of the interleaver table 525) and, accordingly, may be associated with a TCI state 520-*b*.

In some implementations, the CORESET 505-*a* may be associated with the row of the interleaver table 525 corresponding to R=2. In such implementations, REG bundles 515 corresponding to even indices i may be mapped to the TCI state 520-*a* and REG bundles 515 corresponding to odd indices i may be mapped to the TCI state 520-*b*. Based on using the interleaver table 525 with R=2, however, the CORESET 505-*a* may include a first set of contiguous REG bundles 515 that are mapped or otherwise assigned to the TCI state 520-*a* and a second set of contiguous REG bundles 515 that are mapped to or otherwise assigned to the TCI state 520-*b*. For example, the interleaved indices $f(i)$ of 0, 1, 2, 3, 4, and 5 may correspond to non-interleaved indices i of 0, 2, 4, 6, 8, and 10, respectively, which may assign the REG bundles 515 located at the interleaved indices $f(i)$ of 0, 1, 2, 3, 4, and 5 with the TCI state 520-*a*. Similarly, the interleaved indices $f(i)$ of 6, 7, 8, 9, 10, and 11 may correspond to non-interleaved indices i of 1, 3, 5, 7, 9, and 11, respectively, which may assign the REG bundles 515 located at the interleaved indices $f(i)$ of 6, 7, 8, 9, 10, and 11 with the TCI state 520-*b*.

Additionally or alternatively, the REG bundles 515 may be configured such that the REG bundles 515 are associated with CCEs 510 based on the first set of REG bundle indices of the REG bundles 515. In some cases, a CCE 510 may include three REG bundles 515 (e.g., in examples in which L=2) numbered in order prior to interleaving. For instance, a CCE 510-*a* may include REG bundles 515 associated with indices i of 0, 1, or 2, a CCE 510-*b* may include REG bundles 515 associated with indices i of 3, 4, or 5, a CCE 510-*c* may include REG bundles 515 associated with indices i of 6, 7, or 8, and a CCE 510-*d* may include REG bundles 515 associated with indices i of 9, 10, or 11, and so on depending on the number of REG bundles 515 included in a CORESET 505.

In some implementations, the CORESET 505-*b* may be associated with the row of the interleaver table 525 corresponding to R=3. As such, the first three numbered REG bundles 515 of the CORESET 505-*b* prior to interleaving (e.g., corresponding to indices i of 0, 1, and 2) that are associated with the CCE 510-*a* may be interleaved according to $f(\cdot)$ and R=3 and may map to interleaved indices $f(i)$ of 0, 4, and 8. Accordingly, the CCE 510-*a* may include an REG bundle 515-*a*, an REG bundle 515-*b*, and an REG bundle 515-*c*. In some examples, such separation in frequency between the REG bundles 515 of the CCE 510-*a* may provide for more reliable communications based on increased channel bandwidth. Moreover, according to the techniques described herein, the CCE 510-*a* may include REG bundles 515 associated with multiple TCI states 520. For instance, the REG bundle 515-*a* and the REG bundle 515-*c* may be associated with the TCI state 520-*a* and the REG bundle 515-*b* may be associated with the TCI state 520-*b*. Based on including REG bundles 515 associated with multiple TCI states 520, communications using CCE 510-*a* may feature greater diversity and improved reliability compared to a CCE 510 associated with a single TCI state 520.

In some implementations, the CORSET 505-*c* may be associated with the row of the interleaver table 525 corresponding to R=3. In such implementations, REG bundles 515 corresponding to even indices i may be mapped to the TCI state 520-*a* and REG bundles 515 corresponding to odd indices i may be mapped to the TCI state 520-*b*. Based on using the interleaver table 525 with R=3, however, the CORESET 505-*c* may include multiple sets (e.g., pairs) of contiguous REG bundles 515 that are mapped or otherwise assigned to the TCI state 520-*a* and multiple sets (e.g., pairs)

of contiguous REG bundles 515 that are mapped to or otherwise assigned to the TCI state 520-*b*. For example, the interleaved indices ƒ(i) of 0 and 1 may correspond to non-interleaved indices i of 0 and 6, respectively, which may assign the REG bundles 515 located at the interleaved indices ƒ(i) of 0 and 1 with the TCI state 520-*a*. Similarly, the interleaved indices ƒ(i) of 2 and 3 may correspond to non-interleaved indices i of 1 and 7, respectively, which may assign the REG bundles 515 located at the interleaved indices ƒ(i) of 2 and 3 with the TCI state 520-*b*.

Figure 6:
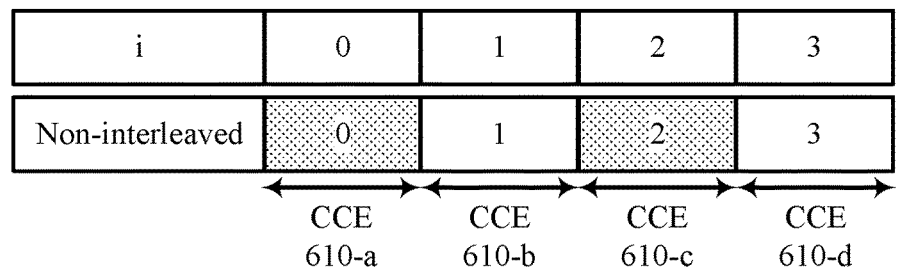
FIG. 6 illustrates an example of a multi-TCI state configuration that supports FDM mapping of TCI states to a control channel in accordance with aspects of the present disclosure.
Figure 6:
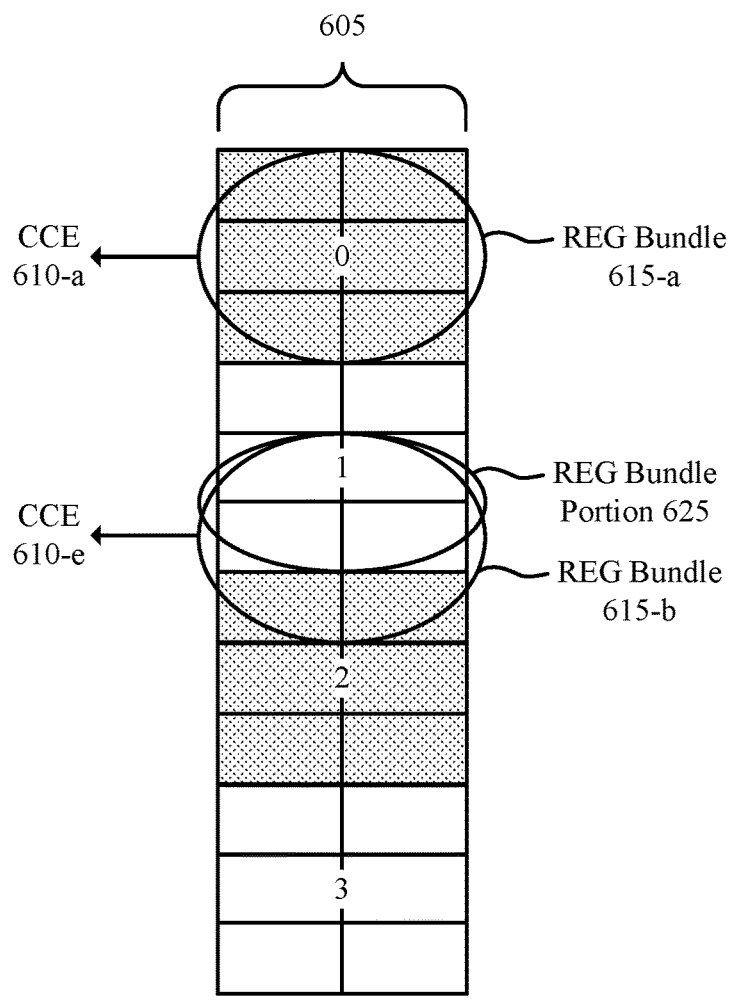

FIG. 6 illustrates an example of a multi-TCI state configuration 600 that supports FDM mapping of TCI states to a control channel in accordance with aspects of the present disclosure. In some examples, the multi-TCI state configuration 600 may be implemented to realize aspects of the wireless communications system 100 or the wireless communications system 200.

The multi-TCI state configuration 600 may be associated with a non-interleaved CCE-to-REG mapping. In some cases in which a non-interleaved CCE-to-REG mapping is used, the REG bundle size L may be equal to 6 (e.g., by definition) such that one REG bundle 615 includes 6 REGs. In such cases, a CCE 610-*a*, a CCE 610-*b*, a CCE 610-*c*, and a CCE 610-*d* may each correspond to a single REG bundle 615. For instance, an REG bundle 615-*a* may correspond to the CCE 610-*a*. Similarly, an REG bundle 615-*b* may correspond to a CCE 610-*e*.

As such, a downlink control channel transmission (e.g., a DCI transmission) associated with some aggregation levels (e.g., an aggregation level of 1) may be associated with a single TCI state 620. For example, REG bundles 615 (e.g., all REG bundles 615) of a CORESET 605 in which a UE 115 may monitor for the downlink control channel transmission (e.g., the DCI transmission) may be associated with a single TCI state 620. As described herein, configuring a downlink control channel with multiple TCI states 620 may increase diversity and reliability of the downlink control channel.

In some implementations, a downlink control channel, and likewise the DCI, may be configured with multiple TCI states 620 based on enabling the REG bundle size L to be less than 6 for a non-interleaved CCE-to-REG mapping. In this way, a downlink control channel transmission associated with any aggregation level may be compatible (e.g., configurable) with multiple TCI states 620. For instance, in the case of non-interleaved CCE-to-REG mapping, the REG bundle size L may be either 2 or 6 in examples in which the CORESET 605 has 1 or 2 symbols and the REG bundle size L may be either 3 or 6 in examples in which the CORESET 605 has 3 symbols. In some implementations, the UE 115 may receive control signaling indicating a value of the REG bundle size L (e.g., the REG bundle size L may be dynamically or semi-statically configured) or the UE 115 may be preconfigured to support different REG bundle sizes L in examples in which the UE 115 uses non-interleaved CCE-to-REG mapping (e.g., the UE 115 may determine a fixed rule that may define what REG bundle sizes L are supported for non-interleaved CCE-to-REG mapping).

Additionally or alternatively, one REG bundle 615 (e.g., including 6 REGs) may be associated with multiple TCI states 620. In such examples in which one REG bundle 615 is associated with multiple TCI states 620, the precoder granularity may be configured for narrowband channel estimation (e.g., precoder granularity may be configured as sameAsREG-bundle) and the unit of channel estimation (e.g., the unit over which a same precoding may be assumed) may become smaller than an REG bundle 615. For example, an REG bundle 615-*b* may include a number of REGs (e.g., RBs) where a first set of the number of REGs may be associated with a TCI state 620-*a* and a second set of the number of REGs may be associated with a TCI state 620-*b*. Accordingly, the UE 115 may assume that the same precoding may be used for REGs within REG bundle 615-*b* that are associated with the same TCI state 620. For instance, the UE 115 may use the same precoding for REGs within REG bundle portion 625 associated with the TCI state 620-*a* and may use a different precoding for a first REG within REG bundle 615-*b* associated with the TCI state 620-*a* and a second REG within REG bundle 615-*b* associated with the TCI state 620-*b*.

Figure 7:
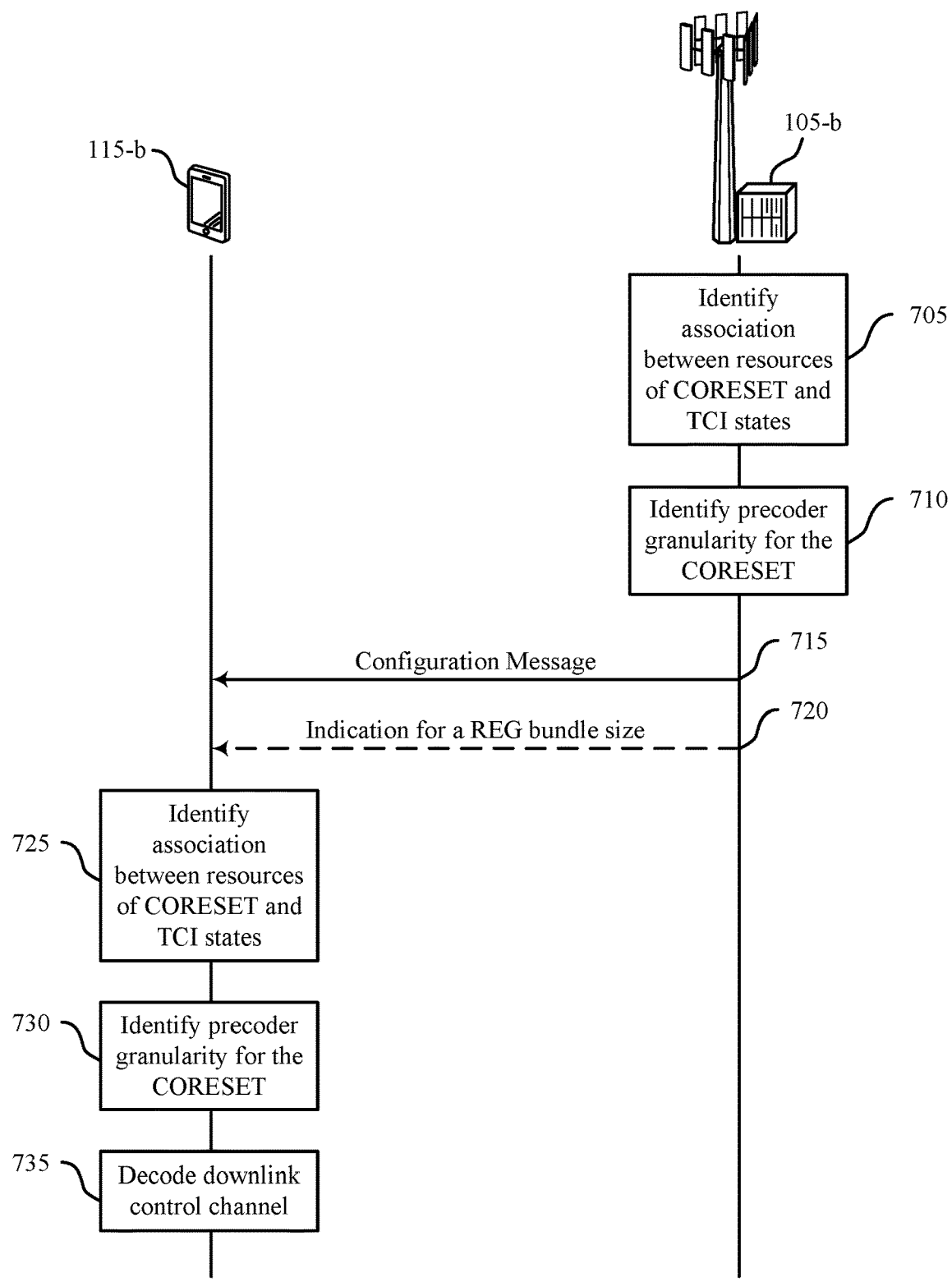
FIG. 7 illustrates an example of a process flow that supports FDM mapping of TCI states to a control channel in accordance with aspects of the present disclosure.

FIG. 7 illustrates an example of a process flow 700 that supports FDM mapping of TCI states to a control channel in accordance with aspects of the present disclosure. In some examples, the process flow 700 may implement aspects of the wireless communications system 100 or the wireless communications system 200. The process flow 700 may include a UE 115-*b* and a base station 105-*b*, which may be examples of corresponding devices described herein, including with reference to FIGS. 1 and 2. The UE 115-*b* and the base station 105-*b* may implement one or more techniques supporting reliable downlink control channel communications by configuring a CORESET associated with a downlink control channel to include resources (e.g., REG bundles) associated with multiple TCI states. Alternative examples of the process flow 700 may be implemented, in which some steps are performed in a different order than described or are not performed at all. In some examples, steps may include additional features not mentioned below, or further steps may be added.

At 705, the base station 105-*b* may identify an association between resources of a CORESET associated with a downlink control channel and a set of TCI states. In some examples, the base station 105-*b* may identify the association based on an FDM mapping (e.g., based on an interleaving or a numbering of frequency resources) of the resources of the CORESET. In some specific implementations, the base station 105-*b* may identify that a first set of resources (e.g., a first set of REG bundles) of the CORESET are associated with a first TCI state or that a second set of resources (e.g., a second set of REG bundles) are associated with a second TCI state, or both.

At 710, the base station 105-*b* may identify a precoder granularity for the CORESET. In some examples, the base station 105-*b* may configure a precoder granularity for the CORESET based on a channel estimation process to be performed by the UE 115-*b*. In some examples, the channel estimation process performed by the UE 115-*b* may be associated with wideband channel estimation (e.g., the precoder granularity is configured as allContiguousRBs). In some other examples, the channel estimation process performed by the UE 115-*b* may be associated with narrowband channel estimation (e.g., the precoder granularity is configured as sameAsREG-bundle).

At 715, the base station 105-*b* may transmit a configuration message indicating that the CORESET is associated with the set of TCI states. In some examples, the configuration message may include the precoder granularity. In some aspects, the base station 105-*b* may transmit the configuration message via higher layer signaling (e.g., via RRC signaling).

At 720, the base station 105-*b* may optionally transmit an indication of a value for an REG bundle size corresponding to REG bundles of the CORESET. For example, the base station 105-*b* may transmit the indication of the REG bundle size in examples in which the mapping is configured as a non-interleaved type (e.g., a non-interleaved CCE-to-REG mapping type). In some implementations, the base station 105-*b* may transmit the indication via control signaling (e.g., RRC signaling). In some implementations, the indication of the REG bundle size may be transmitted in or along with the configuration message transmitted at 715.

At 725, the UE 115-*b* may identify an association between resources of the CORESET and the set of TCI states. In some examples, the association may be based on an FDM mapping of the resources of the CORESET. The UE 115-*b* may identify the association based on a fixed rule (e.g., a preconfigured rule) at the UE 115-*b* or based on signaling from the base station 105-*b*. In examples in which the UE 115-*b* identifies the association between the resources of the CORESET and the set of TCI states based on signaling from the base station 105-*b*, the UE 115-*b* may identify an association between the resources of the CORESET and the set of TCI states based on an indication included within the configuration message sent by the base station 105-*b* at 715 (e.g., the association or rule may be signaled to the UE 115-*b* via RRC signaling).

In some specific implementations, the UE 115-*b* may identify that a first set of resources (e.g., a first set of REG bundles) of the CORESET are associated with a first TCI state and that a second set of resources (e.g., a second set of REG bundles) are associated with a second TCI state. The UE 115-*b* may determine the mapping between the first set of resources and the second set of resources according to the various techniques described herein, such as the techniques described with reference to FIGS. 2-6.

At 730, the UE 115-*b* may identify, from the configuration message, the precoder granularity for the CORESET. In some implementations, the precoder granularity for the CORESET may be based on a channel estimation process to be performed by the UE 115-*b*. The channel estimation process performed by the UE 115-*b* may be associated with wideband channel estimation or narrowband channel estimation. In some implementations, the precoder granularity may be based on the identified association between the resources of the CORESET and the set of TCI states.

At 735, the UE 115-*b* may decode the downlink control channel based on the FDM mapping between the resources of the CORESET and the set of TCI states. In some examples, the UE 115-*b* may employ the association between the resources of the CORESET and the set of TCI states to perform blind decoding of the downlink control channel. Additionally, in some examples, the UE 115-*b* may have a greater likelihood for successfully decoding the downlink control channel based on the association of the downlink control channel and the set of TCI states. For example, multiple TCI states may enhance the diversity of the downlink control channel, reducing the susceptibility of the downlink control channel to poor channel quality characteristics (e.g., interference or signal attenuation).

Figure 8:
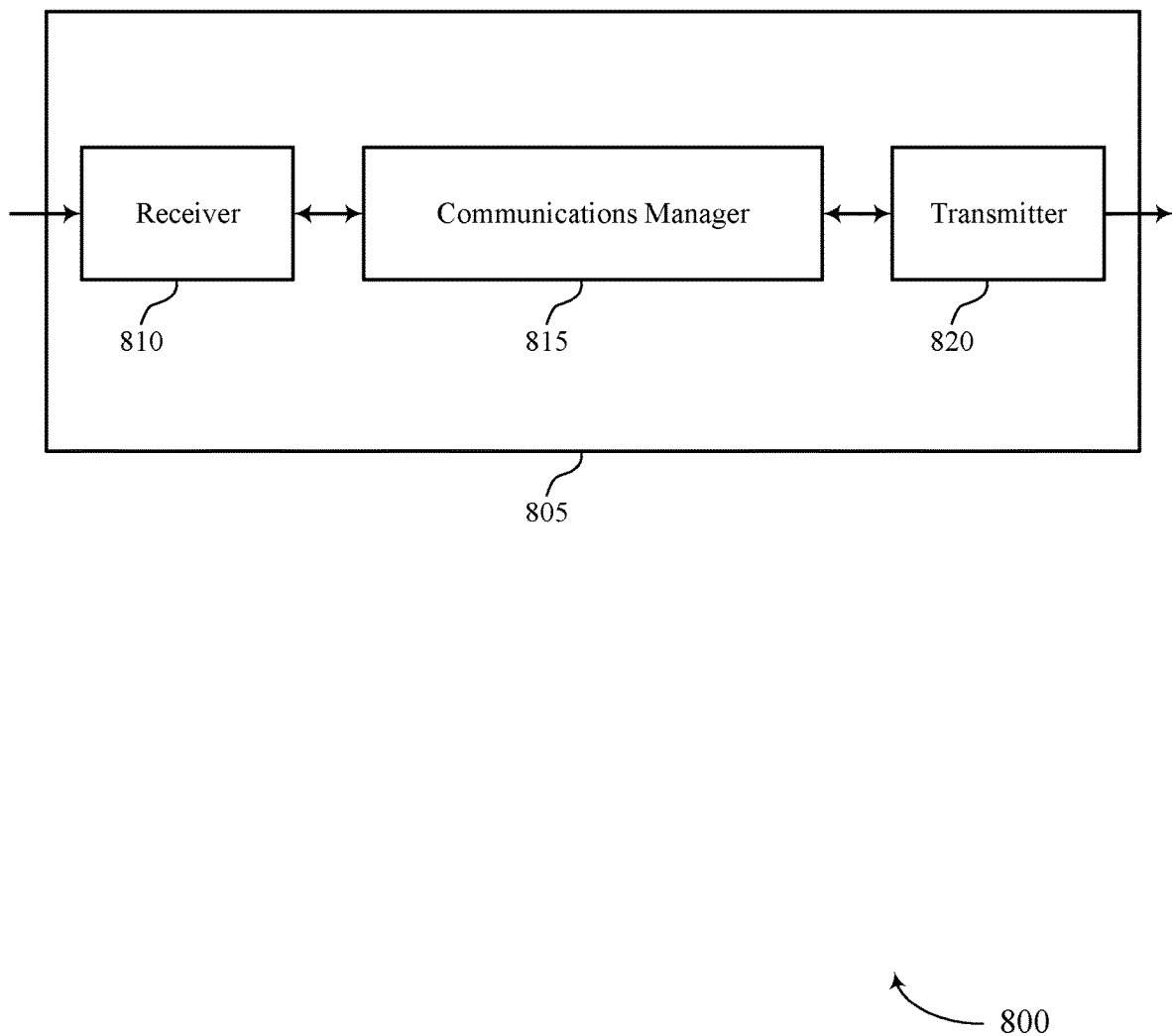
FIGS. 8 and 9 show block diagrams of devices that support FDM mapping of TCI states to a control channel in accordance with aspects of the present disclosure.

FIG. 8 shows a block diagram 800 of a device 805 that supports FDM mapping of TCI states to a control channel in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to FDM mapping of TCI states to a control channel). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a configuration message indicating that a CORESET associated with a downlink control channel is associated with a set of TCI states, identify an association between resources of the CORESET and the set of TCI states based on an FDM mapping, and decode the downlink control channel based on the FDM mapping. The communications manager 815 may be an example of aspects of the communications manager 1110 described herein.

The communications manager 815, or its sub-components, may be implemented in hardware, software (e.g., executed by a processor), or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. In some cases, the device 805 may receive a downlink control channel from a base station 105 in a CORESET associated with the downlink control channel. One implementation of the present disclosure may enable the device 805 to more reliably receive and decode the downlink control channel based on an association between the resources of the CORESET and a set of TCI states (e.g., multiple TCI states).

Accordingly, the device 805 may perform a fewer number of reception opportunities and perform fewer processing operations (e.g., blind decoding operations for the downlink control channel) than a device receiving a downlink control channel associated with a single TCI state. As such, the device 805 may reduce the operational time of one or more processing units for receiving and decoding transmissions at the device, which may result in improved power savings and longer battery life.

Figure 9:
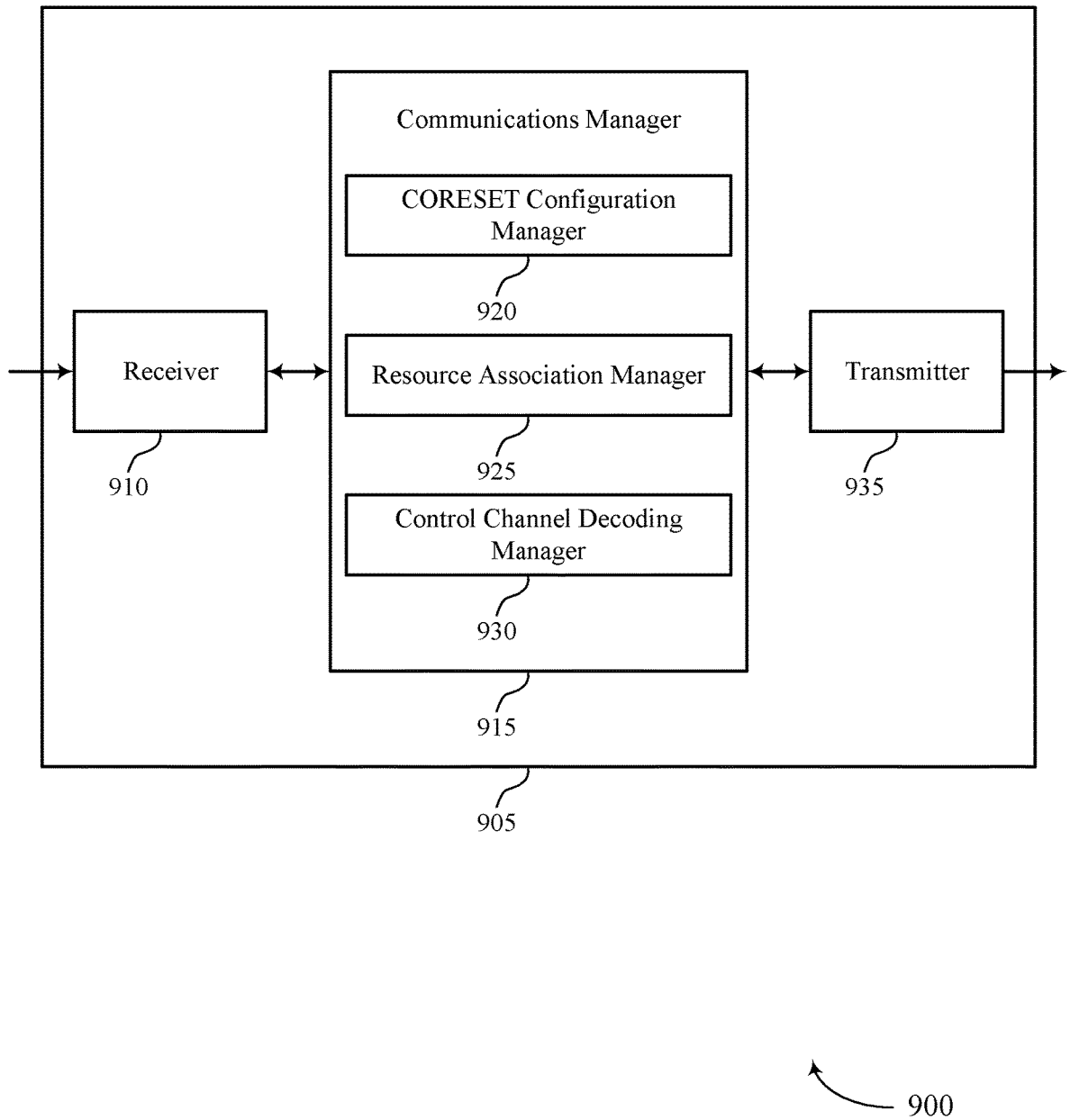

FIG. 9 shows a block diagram 900 of a device 905 that supports FDM mapping of TCI states to a control channel in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to FDM mapping of TCI states to a control channel). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a CORESET configuration manager 920, a resource association manager 925, and a control channel decoding manager 930. The communications manager 915 may be an example of aspects of the communications manager 1110 described herein.

The CORESET configuration manager 920 may receive a configuration message indicating that a control resource set associated with a downlink control channel is associated with a set of TCI states. The resource association manager 925 may identify an association between resources of the control resource set and the set of TCI states based on a frequency division multiplexing mapping. The control channel decoding manager 930 may decode the downlink control channel based on the frequency division multiplexing mapping.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
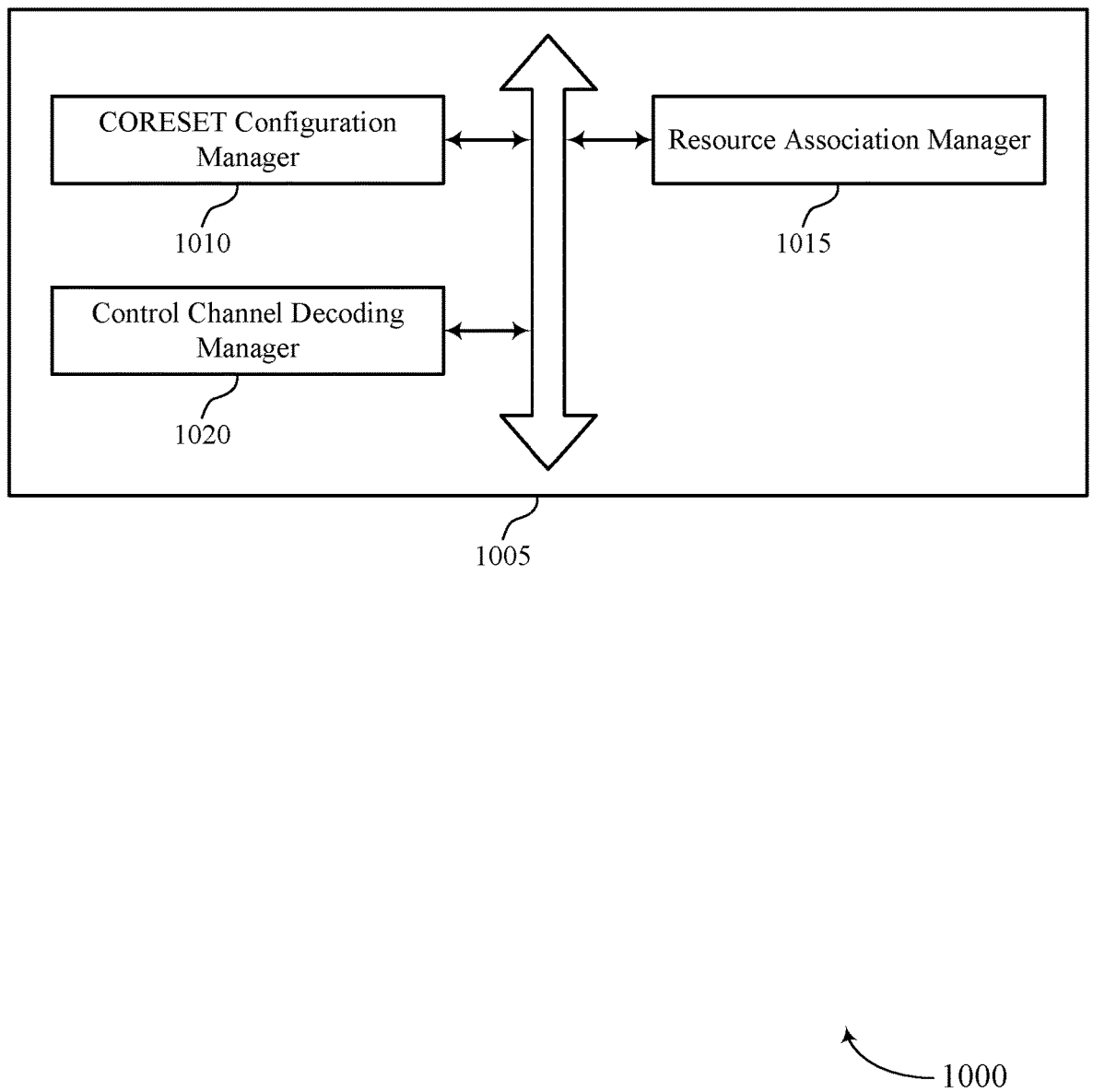
FIG. 10 shows a block diagram of a communications manager that supports FDM mapping of TCI states to a control channel in accordance with aspects of the present disclosure.

FIG. 10 shows a block diagram 1000 of a communications manager 1005 that supports FDM mapping of TCI states to a control channel in accordance with aspects of the present disclosure. The communications manager 1005 may be an example of aspects of a communications manager 815, a communications manager 915, or a communications manager 1110 described herein. The communications manager 1005 may include a CORESET configuration manager 1010, a resource association manager 1015, and a control channel decoding manager 1020. Each of these modules may communicate, directly or indirectly, with one another (e.g., via one or more buses).

The CORESET configuration manager 1010 may receive a configuration message indicating that a CORESET associated with a downlink control channel is associated with a set of TCI states. In some examples, the CORESET configuration manager 1010 may identify from the configuration message that a precoder granularity for the CORESET is configured as wideband channel estimation. In some examples, the CORESET configuration manager 1010 may receive control signaling indicating the first set of REG bundles of the CORESET.

In some examples, the CORESET configuration manager 1010 may receive control signaling indicating the first set of REG bundles of the CORESET within each subset of contiguous RBs of the CORESET. In some examples, the CORESET configuration manager 1010 may receive control signaling indicating the first set of REG bundles of the CORESET and the second set of REG bundles of the CORESET. In some examples, the CORESET configuration manager 1010 may identify from the configuration message that a precoder granularity for the CORESET is configured as narrowband channel estimation.

In some examples, the CORESET configuration manager 1010 may receive control signaling indicating a value for a REG bundle size corresponding to REG bundles of the CORESET, where a mapping type of the CORESET is configured as non-interleaved. In some cases, the configuration message includes RRC signaling.

The resource association manager 1015 may identify an association between resources of the CORESET and the set of TCI states based on an FDM mapping. In some examples, the resource association manager 1015 may determine the second set of REG bundles of the CORESET based on a difference between a total number of REG bundles of the CORESET and the first set of REG bundles. In some examples, the resource association manager 1015 may determine the second set of REG bundles of the CORESET based on a difference between a total number of REG bundles of the CORESET within each subset of contiguous RBs of the CORESET and the first set of REG bundles within each subset of contiguous RBs of the CORESET.

In some cases, the FDM mapping includes a first association between a first set of REG bundles of the CORESET and a first TCI state of the set of TCI states, and a second association between a second set of REG bundles of the CORESET and a second TCI state of the set of TCI states. In some cases, the first set of REG bundles of the CORESET is defined by a ceiling function of a total number of REG bundles of the CORESET divided by two. In some cases, the second set of REG bundles of the CORESET is defined by a difference between the total number of REG bundles of the CORESET and the first set of REG bundles.

In some cases, the first set of REG bundles of the CORESET is defined by a ceiling function of a total number of REG bundles divided by two within each subset of contiguous RBs of the CORESET. In some cases, the second set of REG bundles of the CORESET is defined by a difference between the total number of REG bundles within each subset of contiguous RBs of the CORESET and the first set of REG bundles within each subset of contiguous RBs of the CORESET. In some cases, the first set of REG bundles of the CORESET is assigned to a first set of subsets of contiguous RBs of the CORESET.

In some cases, the second set of REG bundles of the CORESET is assigned to a second set of subsets of contiguous RBs of the CORESET. In some cases, the first set of REG bundles of the CORESET includes REG bundles with even index numbers. In some cases, the second set of REG bundles of the CORESET includes REG bundles with odd index numbers. In some cases, the FDM mapping includes a first association between a first set of REG bundles of a set of CCEs and a first TCI state of the set of TCI states, and a second association between a second set of REG bundles of the set of CCEs and a second TCI state of the set of TCI states.

In some cases, the first set of REG bundles includes REG bundles with even index numbers from CCEs with even index numbers and REG bundles with odd index numbers from CCEs with odd index numbers. In some cases, the second set of REG bundles includes REG bundles with odd index numbers from CCEs with even index numbers and REG bundles with even index numbers from CCEs with odd index numbers. In some cases, a first set of REG bundle indices are mapped to a second set of REG bundle indices based on an interleaver size.

In some cases, the first set of REG bundles include REG bundles having even indices from the first set of REG bundle indices. In some cases, the second set of REG bundles include REG bundles having odd indices from the first set of REG bundle indices. In some cases, the first set of REG bundles includes REG bundles from a first set of downlink control channel candidates. In some cases, the second set of REG bundles includes REG bundles from a second set of downlink control channel candidates. In some cases, the set of CCEs includes a set of CCEs corresponding to a downlink control channel candidate.

In some cases, the FDM mapping includes a first association between a first set of REG bundles of a set of super-bundles and a first TCI state of the set of TCI states, and a second association between a second set of REG bundles of the set of super-bundles and a second TCI state of the set of TCI states. In some cases, a mapping between the resources of the CORESET and control channel elements is mapped in units of super-bundles. In some cases, one or more REG bundles include a first TCI state of the set of TCI states for a first set of RBs of the one or more REG bundles and a second TCI state of the set of TCI states for a second set of RBs of the one or more REG bundles. In some cases, the UE assumes a same precoding within RBs having a same TCI state for channel estimation for a downlink control channel candidate.

The control channel decoding manager 1020 may decode the downlink control channel based on the FDM mapping.

Figure 11:
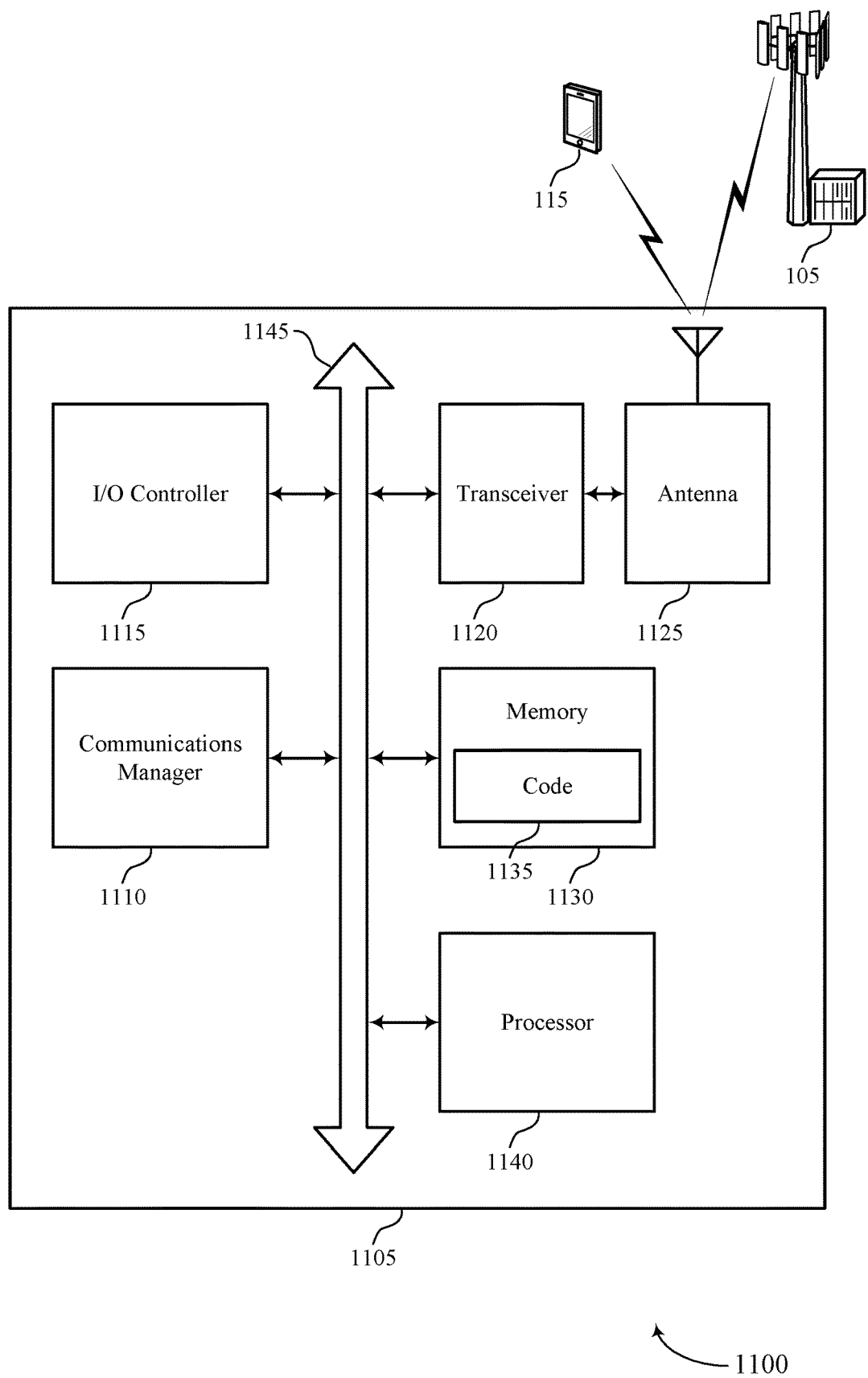
FIG. 11 shows a diagram of a system including a device that supports FDM mapping of TCI states to a control channel in accordance with aspects of the present disclosure.

FIG. 11 shows a diagram of a system 1100 including a device 1105 that supports FDM mapping of TCI states to a control channel in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via (or coupled with) one or more buses (e.g., bus 1145).

The communications manager 1110 may receive a configuration message indicating that a CORESET associated with a downlink control channel is associated with a set of TCI states, identify an association between resources of the CORESET and the set of TCI states based on an FDM mapping, and decode the downlink control channel based on the FDM mapping.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting FDM mapping of TCI states to a control channel).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
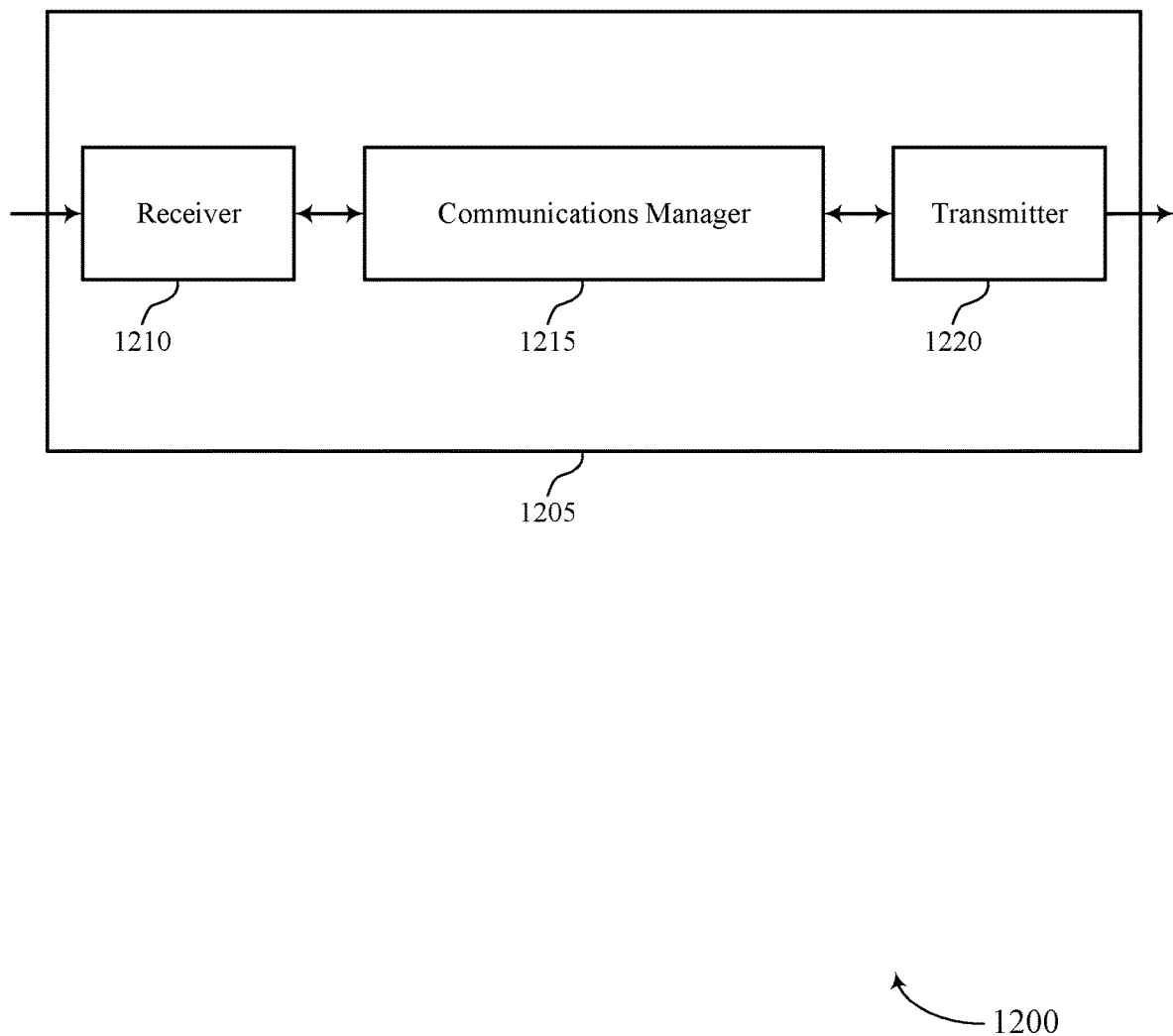
FIGS. 12 and 13 show block diagrams of devices that support FDM mapping of TCI states to a control channel in accordance with aspects of the present disclosure.

FIG. 12 shows a block diagram 1200 of a device 1205 that supports FDM mapping of TCI states to a control channel in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to FDM mapping of TCI states to a control channel). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify an association between resources of a CORESET associated with a downlink control channel and a set of TCI states based on an FDM mapping and transmit a configuration message indicating that the CORESET is associated with the set of TCI states. The communications manager 1215 may be an example of aspects of the communications manager 1510 described herein.

The communications manager 1215, or its sub-components, may be implemented in hardware, software (e.g., executed by a processor), or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

The communication manager 1215 as described herein may be implemented to realize one or more potential advantages. For example, in some implementations, the communications manager 1215 may identify an association between the resources of a CORESET associated with a downlink control channel and a set of TCI states. Accordingly, the device 1205 may transmit to a UE 115 via a downlink control channel (e.g., may transmit a DCI) associated with multiple TCI states.

In some examples, the association between the downlink control transmission and the multiple TCI states may increase the diversity and the reliability of the downlink control channel, which may result in a more reliable overall system. Based on a more reliable system, the device 1205 may perform fewer transmissions and perform fewer processing operations compared to a device operating in a less reliable system, which may result in even less interference generation in the system and reduce the power consumption of the device 1205.

Figure 13:
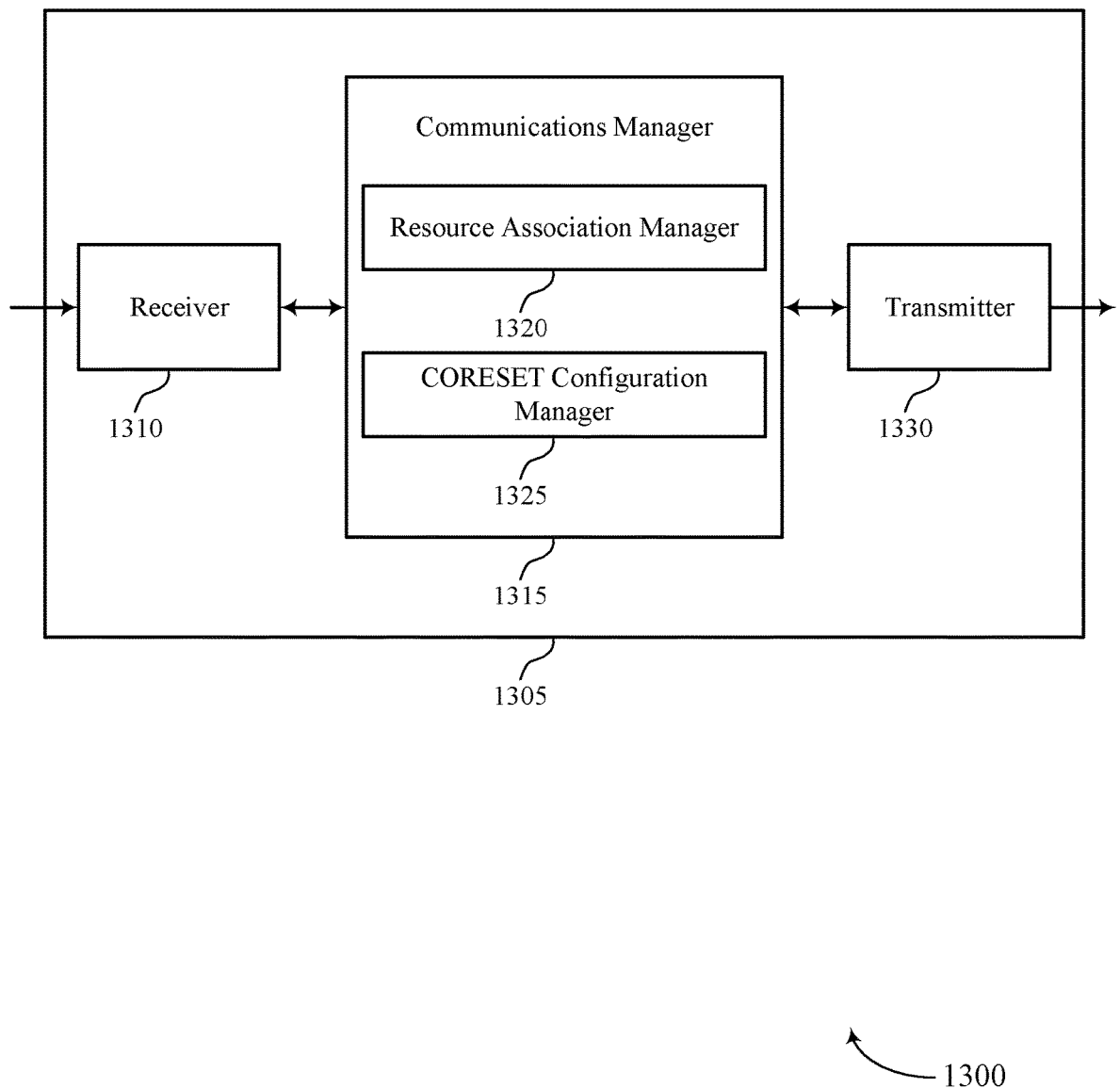

FIG. 13 shows a block diagram 1300 of a device 1305 that supports FDM mapping of TCI states to a control channel in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to FDM mapping of TCI states to a control channel). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a resource association manager 1320 and a CORESET configuration manager 1325. The communications manager 1315 may be an example of aspects of the communications manager 1510 described herein.

The resource association manager 1320 may identify an association between resources of a CORESET associated with a downlink control channel and a set of TCI states based on an FDM mapping. The CORESET configuration manager 1325 may transmit a configuration message indicating that the CORESET is associated with the set of TCI states.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
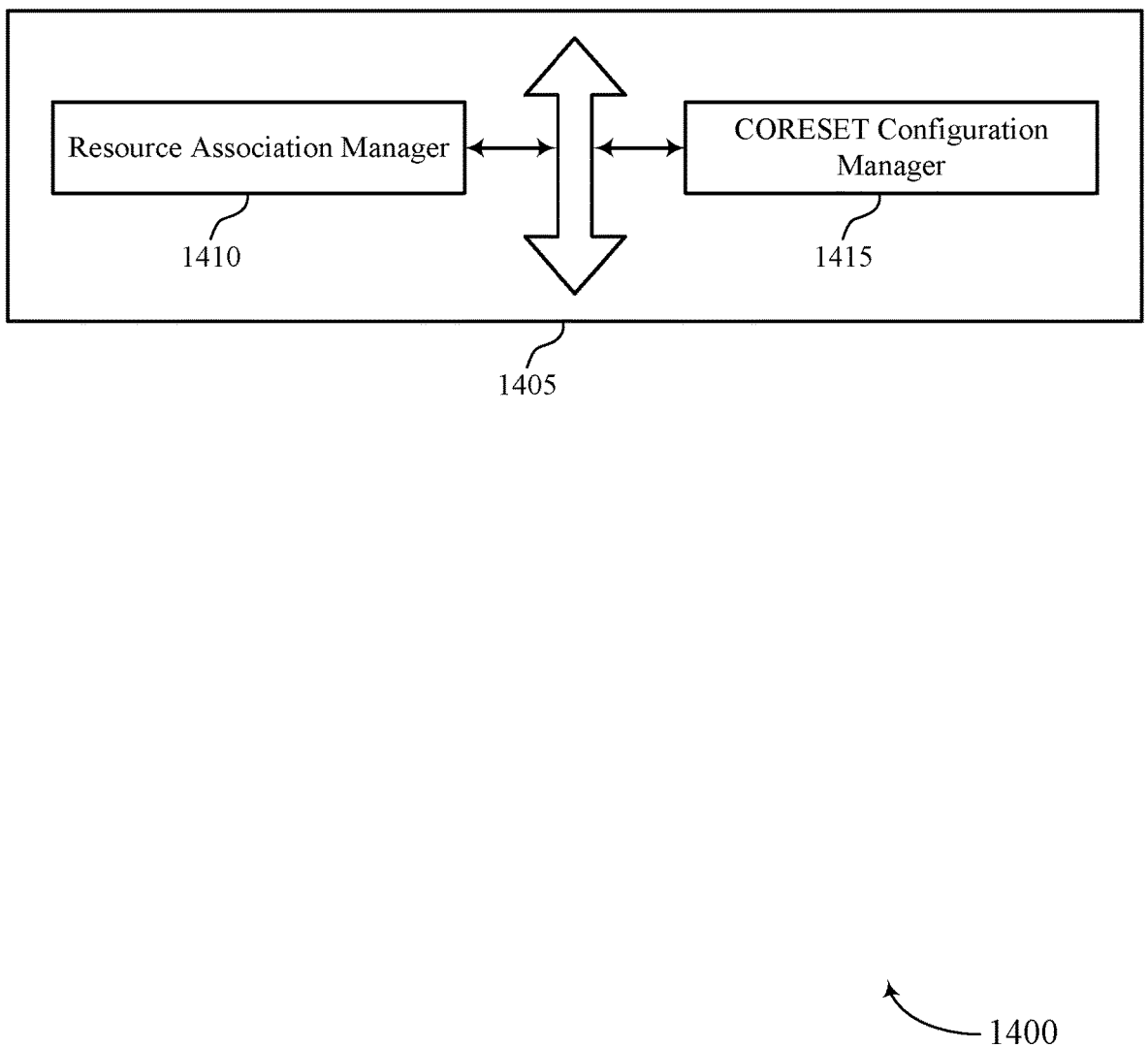
FIG. 14 shows a block diagram of a communications manager that supports FDM mapping of TCI states to a control channel in accordance with aspects of the present disclosure.

FIG. 14 shows a block diagram 1400 of a communications manager 1405 that supports FDM mapping of TCI states to a control channel in accordance with aspects of the present disclosure. The communications manager 1405 may be an example of aspects of a communications manager 1215, a communications manager 1315, or a communications manager 1510 described herein. The communications manager 1405 may include a resource association manager 1410 and a CORESET configuration manager 1415. Each of these modules may communicate, directly or indirectly, with one another (e.g., via one or more buses).

The resource association manager 1410 may identify an association between resources of a CORESET associated with a downlink control channel and a set of TCI states based on an FDM mapping. In some examples, the resource association manager 1410 may determine the second set of REG bundles of the CORESET based on a difference between a total number of REG bundles of the CORESET and the first set of REG bundles. In some examples, the resource association manager 1410 may determine the second set of REG bundles of the CORESET based on a difference between a total number of REG bundles of the CORESET within each subset of contiguous RBs of the CORESET and the first set of REG bundles within each subset of contiguous RBs of the CORESET.

In some cases, the FDM mapping includes a first association between a first set of REG bundles of the CORESET and a first TCI state of the set of TCI states, and a second association between a second set of REG bundles of the CORESET and a second TCI state of the set of TCI states.

In some cases, the first set of REG bundles of the CORESET is defined by a ceiling function of a total number of REG bundles of the CORESET divided by two. In some cases, the second set of REG bundles of the CORESET is defined by a difference between the total number of REG bundles of the CORESET and the first set of REG bundles.

In some cases, the first set of REG bundles of the CORESET is defined by a ceiling function of a total number of REG bundles divided by two within each subset of contiguous RBs of the CORESET. In some cases, the second set of REG bundles of the CORESET is defined by a difference between the total number of REG bundles within each subset of contiguous RBs of the CORESET and the first set of REG bundles within each subset of contiguous RBs of the CORESET. In some cases, the first set of REG bundles of the CORESET is assigned to a first set of subsets of contiguous RBs of the CORESET.

In some cases, the second set of REG bundles of the CORESET is assigned to a second set of subsets of contiguous RBs of the CORESET. In some cases, the first set of REG bundles of the CORESET includes REG bundles with even index numbers. In some cases, the second set of REG bundles of the CORESET includes REG bundles with odd index numbers.

In some cases, the FDM mapping includes a first association between a first set of REG bundles of a set of CCEs and a first TCI state of the set of TCI states, and a second association between a second set of REG bundles of the set of CCEs and a second TCI state of the set of TCI states. In some cases, the first set of REG bundles includes REG bundles with even index numbers from CCEs with even index numbers and REG bundles with odd index numbers from CCEs with odd index numbers.

In some cases, the second set of REG bundles includes REG bundles with odd index numbers from CCEs with even index numbers and REG bundles with even index numbers from CCEs with odd index numbers. In some cases, a first set of REG bundle indices are mapped to a second set of REG bundle indices based on an interleaver size. In some cases, the first set of REG bundles include REG bundles having even indices from the first set of REG bundle indices.

In some cases, the second set of REG bundles include REG bundles having odd indices from the first set of REG bundle indices. In some cases, the first set of REG bundles includes REG bundles from a first set of downlink control channel candidates. In some cases, the second set of REG bundles includes REG bundles from a second set of downlink control channel candidates.

In some cases, the set of CCEs includes a set of CCEs corresponding to a downlink control channel candidate. In some cases, the FDM mapping includes a first association between a first set of REG bundles of a set of super-bundles and a first TCI state of the set of TCI states, and a second association between a second set of REG bundles of the set of super-bundles and a second TCI state of the set of TCI states. In some cases, a mapping between the resources of the CORESET and CCEs is mapped in units of super-bundles. In some cases, one or more REG bundles include a first TCI state of the set of TCI states for a first set of RBs of the one or more REG bundles and a second TCI state of the set of TCI states for a second set of RBs of the one or more REG bundles.

The CORESET configuration manager 1415 may transmit a configuration message indicating that the CORESET is associated with the set of TCI states. In some examples, the CORESET configuration manager 1415 may identify from the configuration message that a precoder granularity for the CORESET is configured as wideband channel estimation. In some examples, the CORESET configuration manager 1415 may transmit control signaling indicating the first set of REG bundles of the CORESET.

In some examples, the CORESET configuration manager 1415 may transmit control signaling indicating the first set of REG bundles of the CORESET within each subset of contiguous RBs of the CORESET. In some examples, the CORESET configuration manager 1415 may transmit control signaling indicating the first set of REG bundles of the CORESET and the second set of REG bundles of the CORESET. In some examples, the CORESET configuration manager 1415 may identify from the configuration message that a precoder granularity for the CORESET is configured as narrowband channel estimation.

In some examples, the CORESET configuration manager 1415 may transmit control signaling indicating a value for a REG bundle size corresponding to REG bundles of the CORESET, where a mapping type of the CORESET is configured as non-interleaved. In some cases, the configuration message includes RRC signaling.

Figure 15:
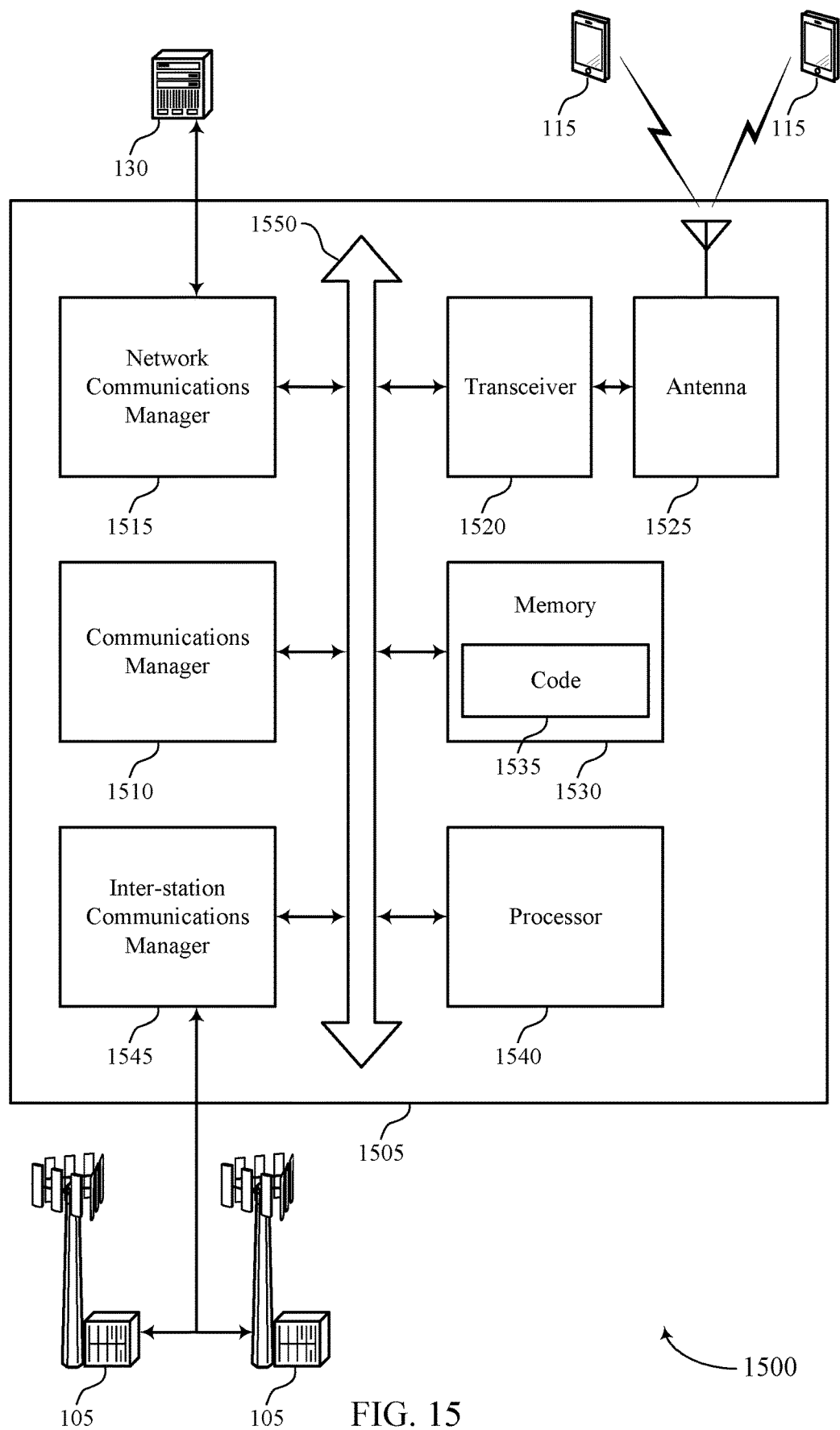
FIG. 15 shows a diagram of a system including a device that supports FDM mapping of TCI states to a control channel in accordance with aspects of the present disclosure.

FIG. 15 shows a diagram of a system 1500 including a device 1505 that supports FDM mapping of TCI states to a control channel in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via (or coupled with) one or more buses (e.g., bus 1550).

The communications manager 1510 may identify an association between resources of a CORESET associated with a downlink control channel and a set of TCI states based on an FDM mapping and transmit a configuration message indicating that the CORESET is associated with the set of TCI states.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting FDM mapping of TCI states to a control channel).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
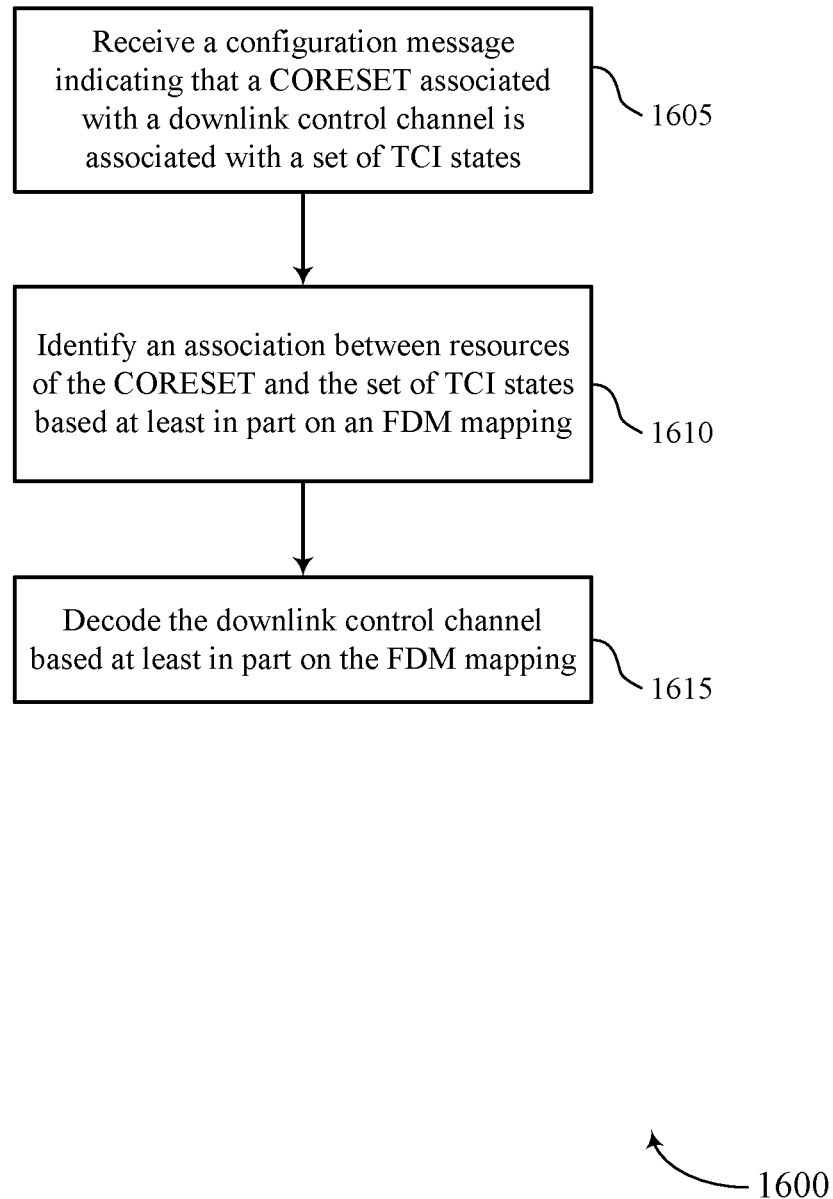
FIGS. 16 through 23 show flowcharts illustrating methods that support FDM mapping of TCI states to a control channel in accordance with aspects of the present disclosure.

FIG. 16 shows a flowchart illustrating a method 1600 that supports FDM mapping of TCI states to a control channel in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive a configuration message indicating that a CORESET associated with a downlink control channel is associated with a set of TCI states. The operations of 1605 may be performed according to the methods described herein. In some examples, aspects of the operations of 1605 may be performed by a CORESET configuration manager as described with reference to FIGS. 8 through 11.

At 1610, the UE may identify an association between resources of the CORESET and the set of TCI states based at least in part on an FDM mapping. The operations of 1610 may be performed according to the methods described herein. In some examples, aspects of the operations of 1610 may be performed by a resource association manager as described with reference to FIGS. 8 through 11.

At 1615, the UE may decode the downlink control channel based at least in part on the FDM mapping. The operations of 1615 may be performed according to the methods described herein. In some examples, aspects of the operations of 1615 may be performed by a control channel decoding manager as described with reference to FIGS. 8 through 11.

Figure 17:
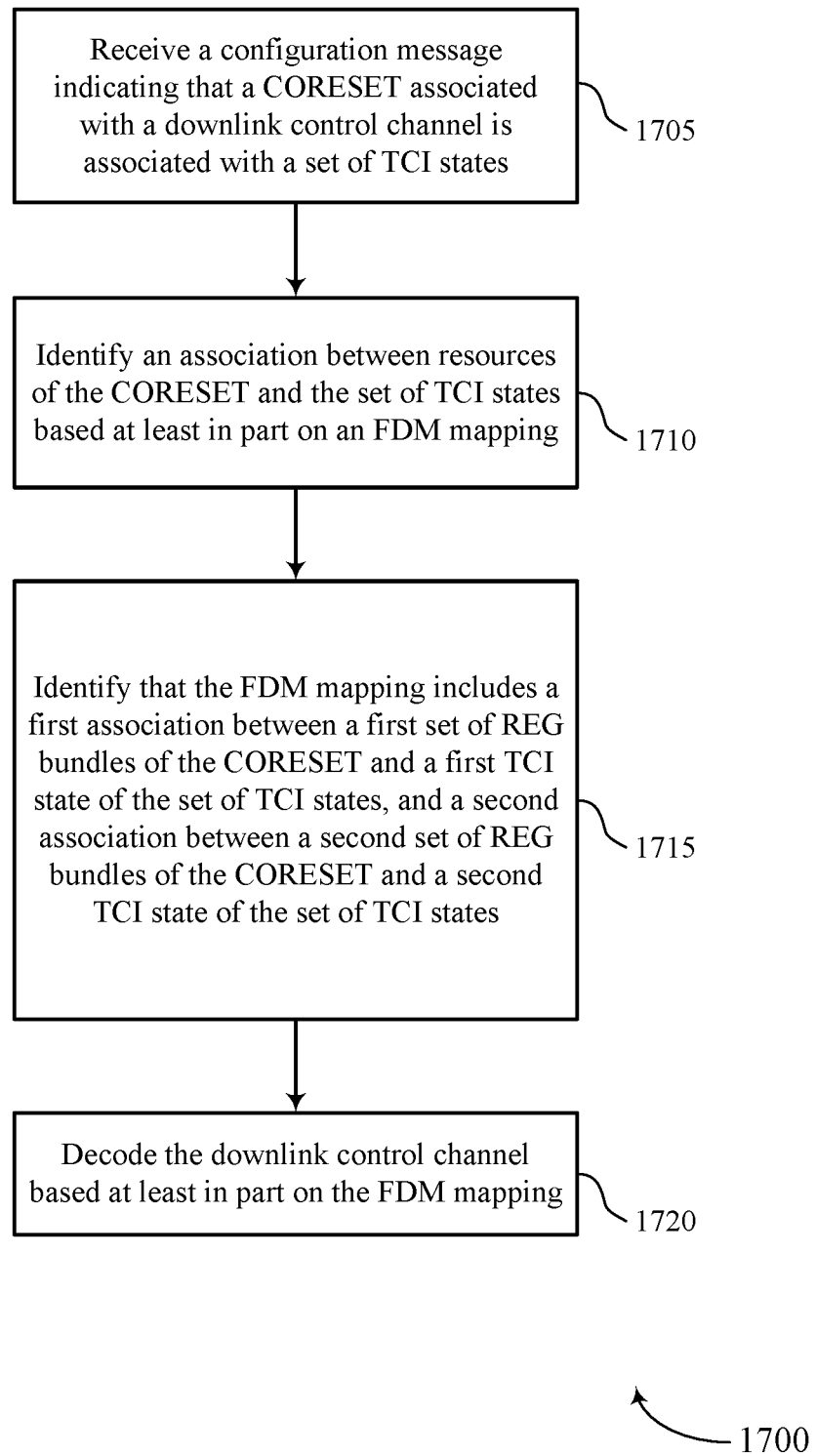

FIG. 17 shows a flowchart illustrating a method 1700 that supports FDM mapping of TCI states to a control channel in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive a configuration message indicating that a CORESET associated with a downlink control channel is associated with a set of TCI states. The operations of 1705 may be performed according to the methods described herein. In some examples, aspects of the operations of 1705 may be performed by a CORESET configuration manager as described with reference to FIGS. 8 through 11.

At 1710, the UE may identify an association between resources of the CORESET and the set of TCI states based at least in part on an FDM mapping. The operations of 1710 may be performed according to the methods described herein. In some examples, aspects of the operations of 1710 may be performed by a resource association manager as described with reference to FIGS. 8 through 11.

At 1715, the UE may identify that the FDM mapping includes a first association between a first set of REG bundles of the CORESET and a first TCI state of the set of TCI states, and a second association between a second set of REG bundles of the CORESET and a second TCI state of the set of TCI states. The operations of 1715 may be performed according to the methods described herein. In some examples, aspects of the operations of 1715 may be performed by a resource association manager as described with reference to FIGS. 8 through 11.

At 1720, the UE may decode the downlink control channel based at least in part on the FDM mapping. The operations of 1720 may be performed according to the methods described herein. In some examples, aspects of the operations of 1720 may be performed by a control channel decoding manager as described with reference to FIGS. 8 through 11.

Figure 18:
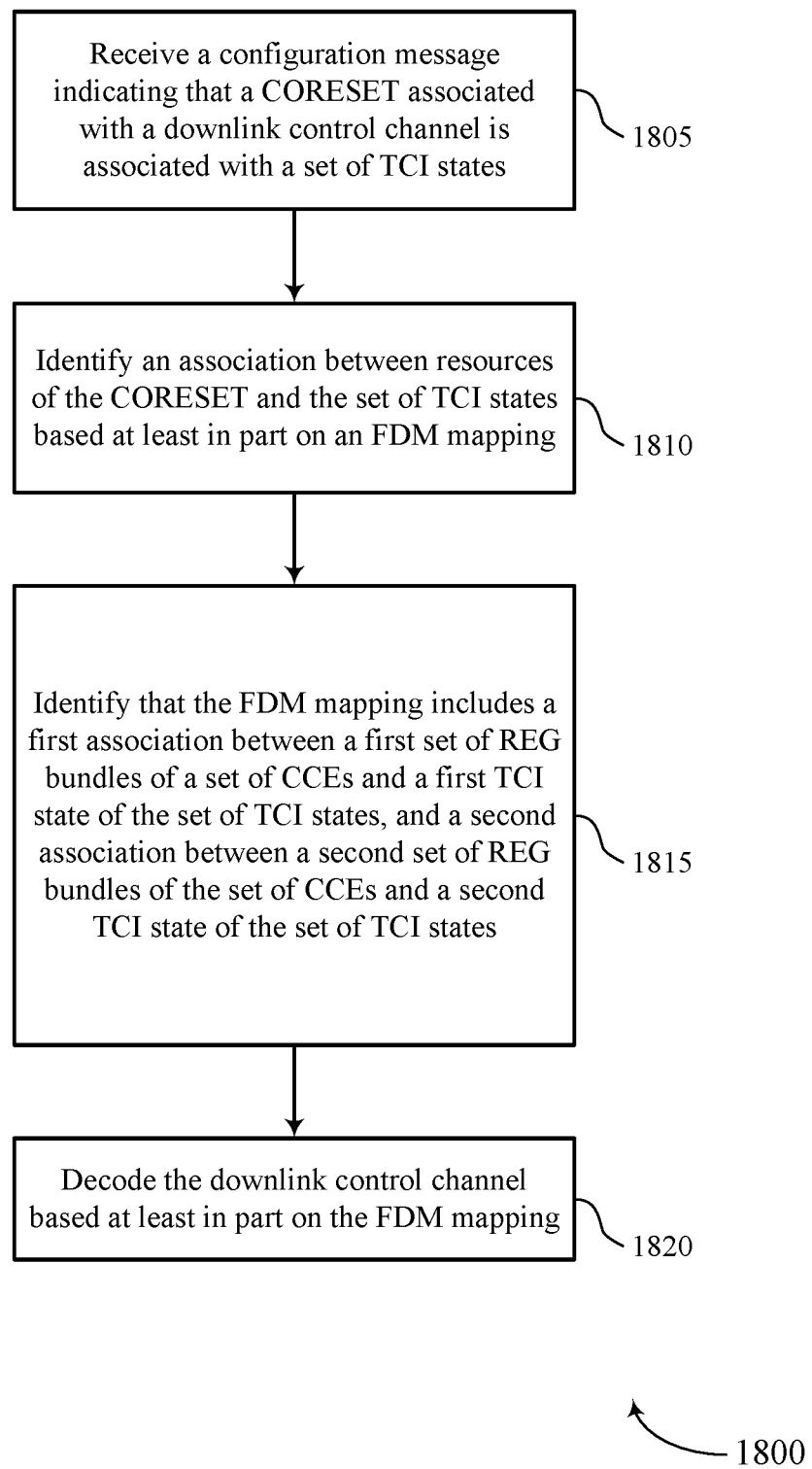

FIG. 18 shows a flowchart illustrating a method 1800 that supports FDM mapping of TCI states to a control channel in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may receive a configuration message indicating that a CORESET associated with a downlink control channel is associated with a set of TCI states. The operations of 1805 may be performed according to the methods described herein. In some examples, aspects of the operations of 1805 may be performed by a CORESET configuration manager as described with reference to FIGS. 8 through 11.

At 1810, the UE may identify an association between resources of the CORESET and the set of TCI states based at least in part on an FDM mapping. The operations of 1810 may be performed according to the methods described herein. In some examples, aspects of the operations of 1810 may be performed by a resource association manager as described with reference to FIGS. 8 through 11.

At 1815, the UE may identify that the FDM mapping includes a first association between a first set of REG bundles of a set of CCEs and a first TCI state of the set of TCI states, and a second association between a second set of REG bundles of the set of CCEs and a second TCI state of the set of TCI states. The operations of 1815 may be performed according to the methods described herein. In some examples, aspects of the operations of 1815 may be performed by a resource association manager as described with reference to FIGS. 8 through 11.

At 1820, the UE may decode the downlink control channel based at least in part on the FDM mapping. The operations of 1820 may be performed according to the methods described herein. In some examples, aspects of the operations of 1820 may be performed by a control channel decoding manager as described with reference to FIGS. 8 through 11.

Figure 19:
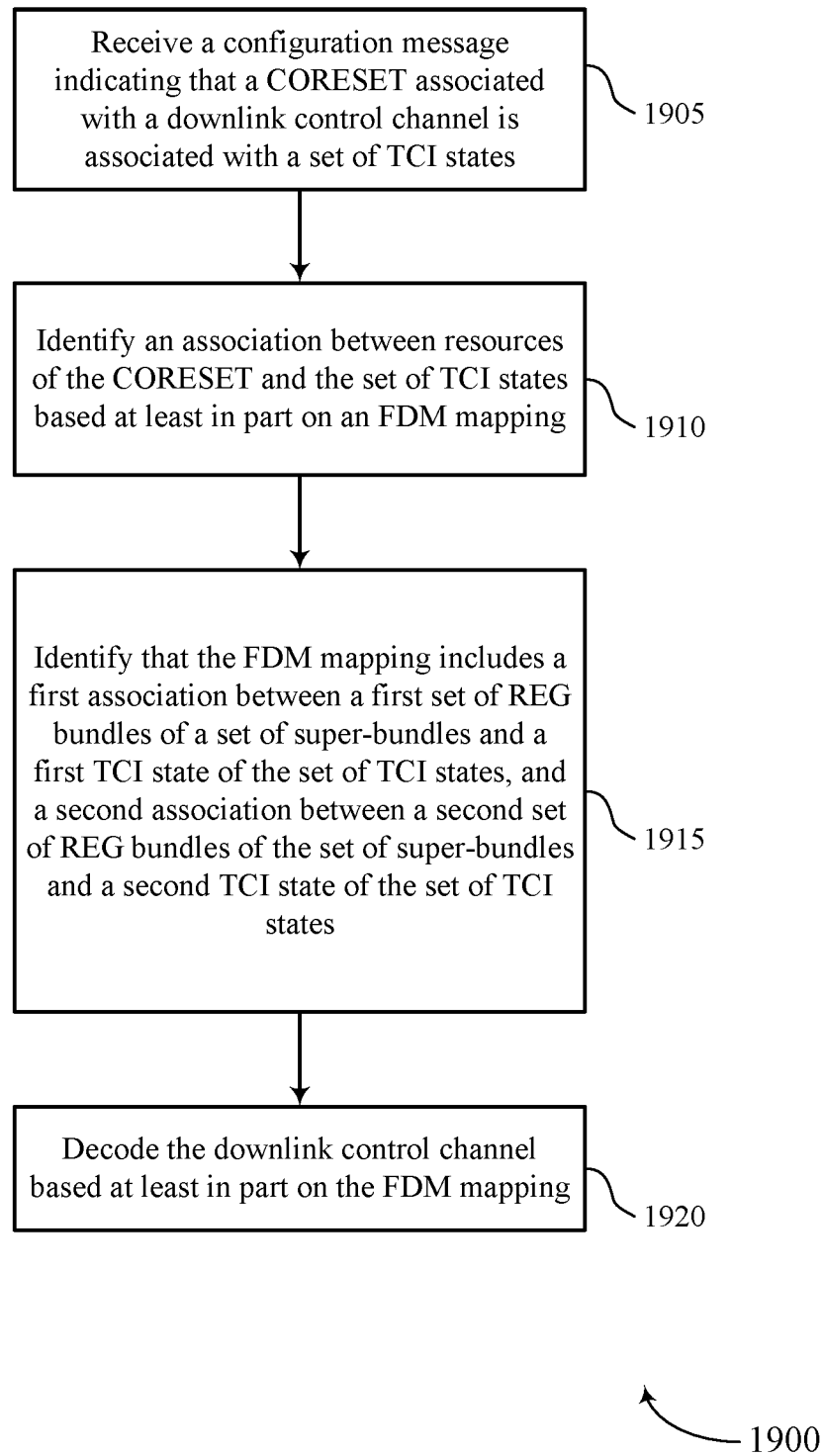

FIG. 19 shows a flowchart illustrating a method 1900 that supports FDM mapping of TCI states to a control channel in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1905, the UE may receive a configuration message indicating that a CORESET associated with a downlink control channel is associated with a set of TCI states. The operations of 1905 may be performed according to the methods described herein. In some examples, aspects of the operations of 1905 may be performed by a CORESET configuration manager as described with reference to FIGS. 8 through 11.

At 1910, the UE may identify an association between resources of the CORESET and the set of TCI states based at least in part on an FDM mapping. The operations of 1910 may be performed according to the methods described herein. In some examples, aspects of the operations of 1910 may be performed by a resource association manager as described with reference to FIGS. 8 through 11.

At 1915, the UE may identify that the FDM mapping includes a first association between a first set of REG bundles of a set of super-bundles and a first TCI state of the set of TCI states, and a second association between a second set of REG bundles of the set of super-bundles and a second TCI state of the set of TCI states. The operations of 1915 may be performed according to the methods described herein. In some examples, aspects of the operations of 1915 may be performed by a resource association manager as described with reference to FIGS. 8 through 11.

At 1920, the UE may decode the downlink control channel based at least in part on the FDM mapping. The operations of 1920 may be performed according to the methods described herein. In some examples, aspects of the operations of 1920 may be performed by a control channel decoding manager as described with reference to FIGS. 8 through 11.

Figure 20:
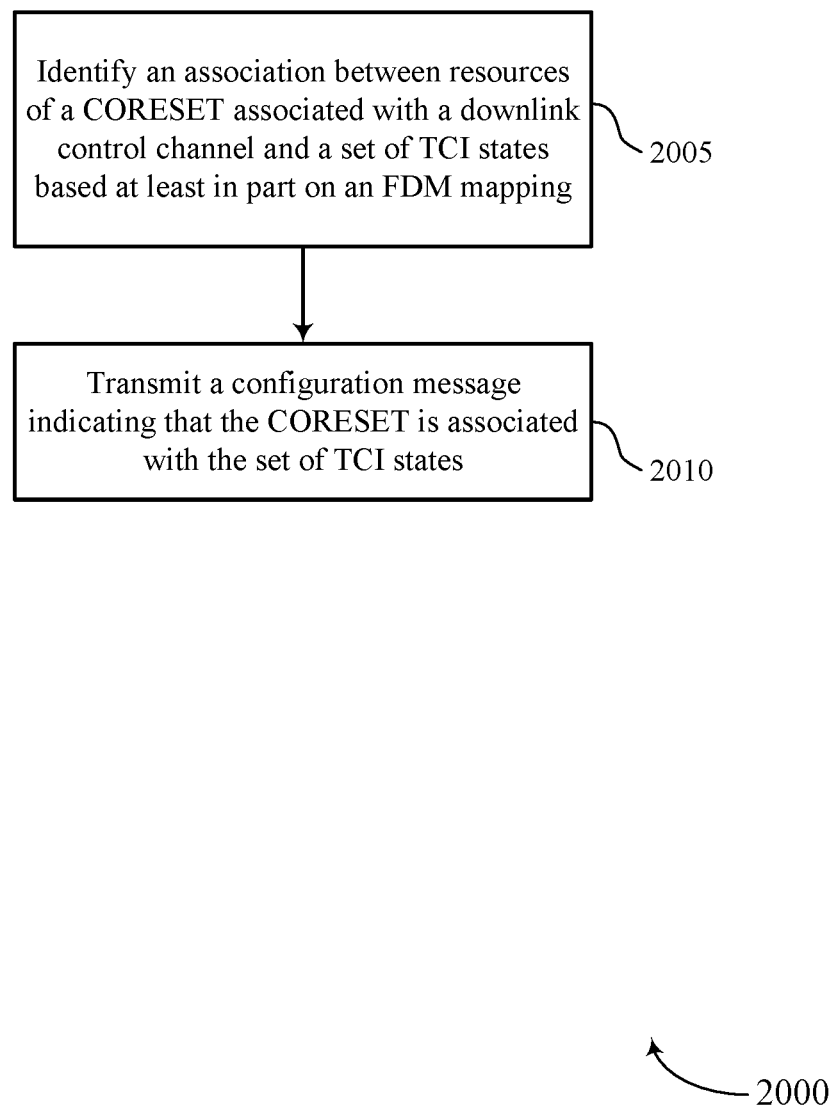

FIG. 20 shows a flowchart illustrating a method 2000 that supports FDM mapping of TCI states to a control channel in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2005, the base station may identify an association between resources of a CORESET associated with a downlink control channel and a set of TCI states based at least in part on an FDM mapping. The operations of 2005 may be performed according to the methods described herein. In some examples, aspects of the operations of 2005 may be performed by a resource association manager as described with reference to FIGS. 12 through 15.

At 2010, the base station may transmit a configuration message indicating that the CORESET is associated with the set of TCI states. The operations of 2010 may be performed according to the methods described herein. In some examples, aspects of the operations of 2010 may be performed by a CORESET configuration manager as described with reference to FIGS. 12 through 15.

Figure 21:
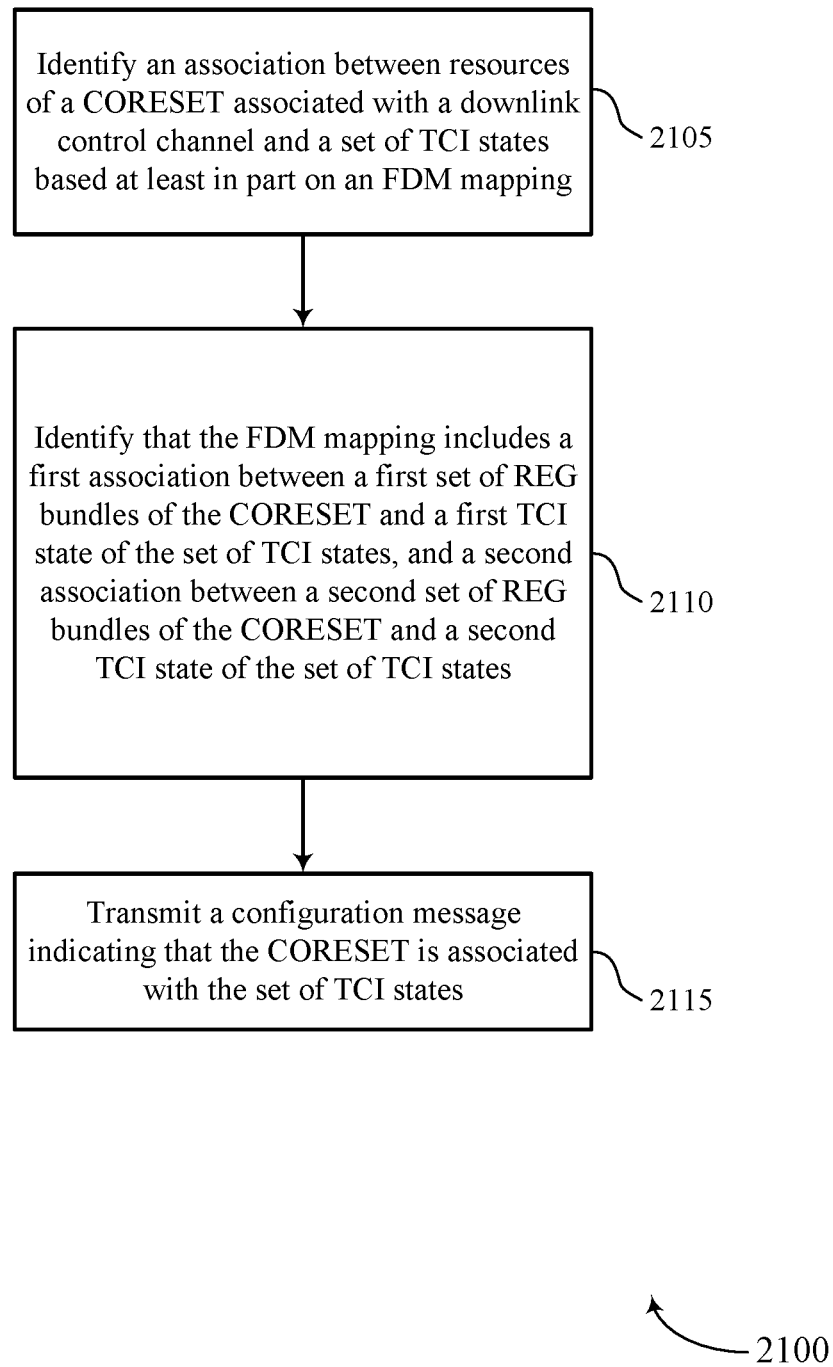

FIG. 21 shows a flowchart illustrating a method 2100 that supports FDM mapping of TCI states to a control channel in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2105, the base station may identify an association between resources of a CORESET associated with a downlink control channel and a set of TCI states based at least in part on an FDM mapping. The operations of 2105 may be performed according to the methods described herein. In some examples, aspects of the operations of 2105 may be performed by a resource association manager as described with reference to FIGS. 12 through 15.

At 2110, the base station may identify that the FDM mapping includes a first association between a first set of REG bundles of the CORESET and a first TCI state of the set of TCI states, and a second association between a second set of REG bundles of the CORESET and a second TCI state of the set of TCI states. The operations of 2110 may be performed according to the methods described herein. In some examples, aspects of the operations of 2110 may be performed by a resource association manager as described with reference to FIGS. 12 through 15.

At 2115, the base station may transmit a configuration message indicating that the CORESET is associated with the set of TCI states. The operations of 2115 may be performed according to the methods described herein. In some examples, aspects of the operations of 2115 may be performed by a CORESET configuration manager as described with reference to FIGS. 12 through 15.

Figure 22:
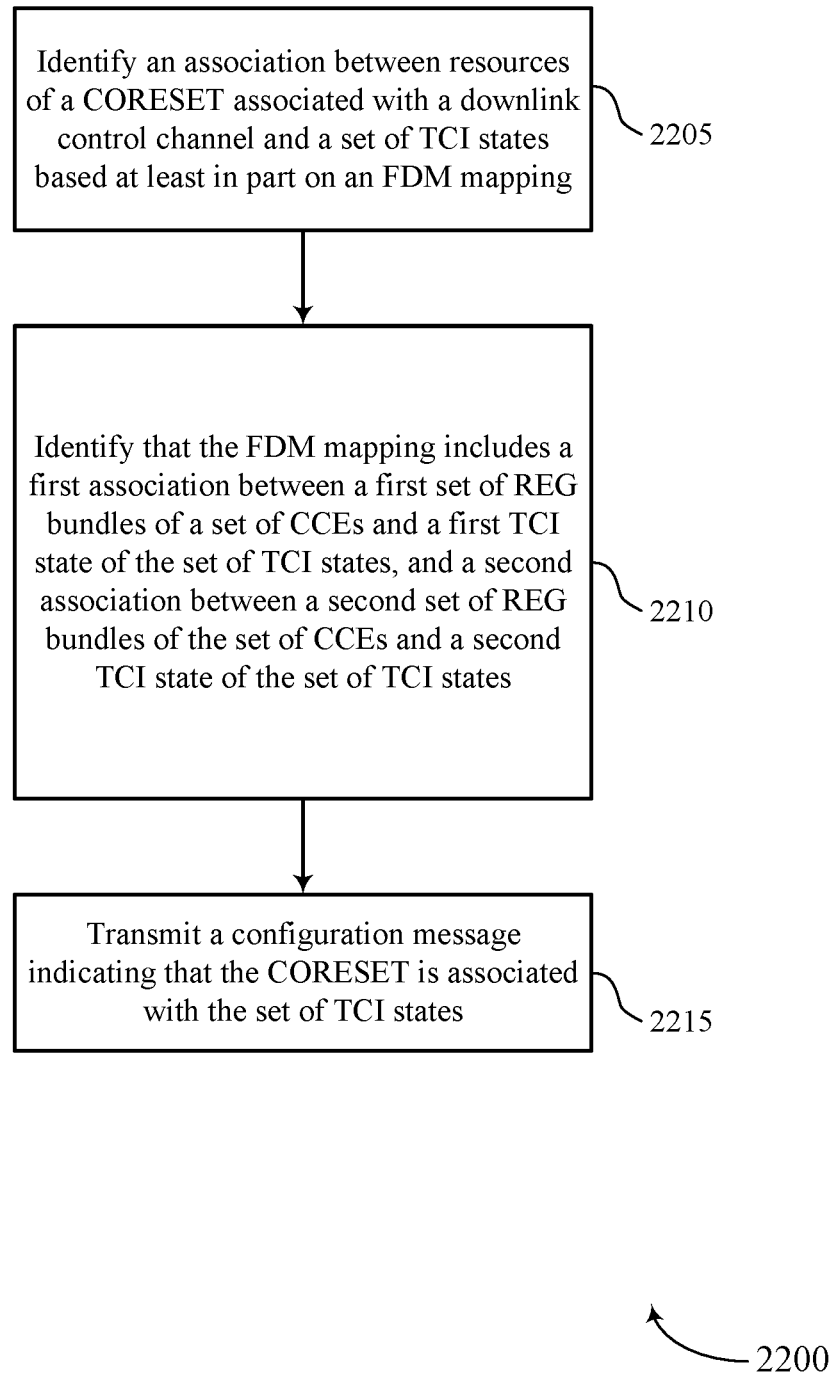

FIG. 22 shows a flowchart illustrating a method 2200 that supports FDM mapping of TCI states to a control channel in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2205, the base station may identify an association between resources of a CORESET associated with a downlink control channel and a set of TCI states based at least in part on an FDM mapping. The operations of 2205 may be performed according to the methods described herein. In some examples, aspects of the operations of 2205 may be performed by a resource association manager as described with reference to FIGS. 12 through 15.

At 2210, the base station may identify that the FDM mapping includes a first association between a first set of REG bundles of a set of CCEs and a first TCI state of the set of TCI states, and a second association between a second set of REG bundles of the set of CCEs and a second TCI state of the set of TCI states. The operations of 2210 may be performed according to the methods described herein. In some examples, aspects of the operations of 2210 may be performed by a resource association manager as described with reference to FIGS. 12 through 15.

At 2215, the base station may transmit a configuration message indicating that the CORESET is associated with the set of TCI states. The operations of 2215 may be performed according to the methods described herein. In some examples, aspects of the operations of 2215 may be performed by a CORESET configuration manager as described with reference to FIGS. 12 through 15.

Figure 23:
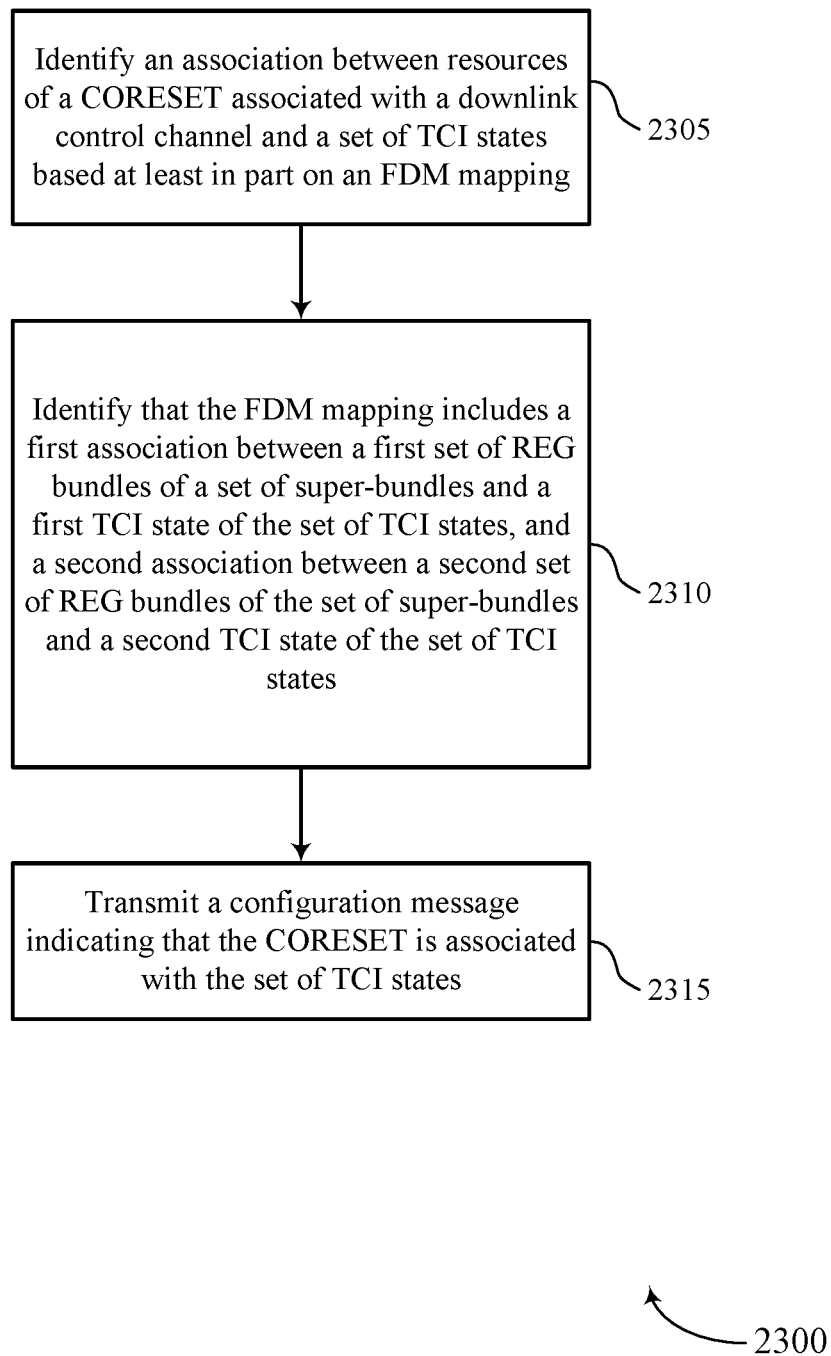

FIG. 23 shows a flowchart illustrating a method 2300 that supports FDM mapping of TCI states to a control channel in accordance with aspects of the present disclosure. The operations of method 2300 may be implemented by a base station 105 or its components as described herein. For example, the operations of method 2300 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2305, the base station may identify an association between resources of a CORESET associated with a downlink control channel and a set of TCI states based at least in part on an FDM mapping. The operations of 2305 may be performed according to the methods described herein. In some examples, aspects of the operations of 2305 may be performed by a resource association manager as described with reference to FIGS. 12 through 15.

At 2310, the base station may identify that the FDM mapping includes a first association between a first set of REG bundles of a set of super-bundles and a first TCI state of the set of TCI states, and a second association between a second set of REG bundles of the set of super-bundles and a second TCI state of the set of TCI states. The operations of 2310 may be performed according to the methods described herein. In some examples, aspects of the operations of 2310 may be performed by a resource association manager as described with reference to FIGS. 12 through 15.

At 2315, the base station may transmit a configuration message indicating that the CORESET is associated with the set of TCI states. The operations of 2315 may be performed according to the methods described herein. In some examples, aspects of the operations of 2315 may be performed by a CORESET configuration manager as described with reference to FIGS. 12 through 15.

The following provides an overview of some aspects of the present disclosure:

Aspect 1: A method for wireless communications at a UE, comprising: receiving a configuration message indicating that a CORESET associated with a downlink control channel is associated with a plurality of TCI states; identifying an association between resources of the CORESET and the plurality of TCI states based at least in part on an FDM mapping; and decoding the downlink control channel based at least in part on the FDM mapping.

Aspect 2: The method of aspect 1, wherein the FDM mapping comprises a first association between a first set of REG bundles of the CORESET and a first TCI state of the plurality of TCI states, and a second association between a second set of REG bundles of the CORESET and a second TCI state of the plurality of TCI states.

Aspect 3: The method of aspect 2, further comprising: identifying from the configuration message that a precoder granularity for the CORESET is configured as wideband channel estimation.

Aspect 4: The method of aspect 3, further comprising: receiving control signaling indicating the first set of REG bundles of the CORESET; and determining the second set of REG bundles of the CORESET based at least in part on a difference between a total number of REG bundles of the CORESET and the first set of REG bundles.

Aspect 5: The method of aspect 3, wherein the first set of REG bundles of the CORESET is defined by a ceiling function of a total number of REG bundles divided by two within each subset of contiguous RBs of the CORESET; and the second set of REG bundles of the CORESET is defined by a difference between the total number of REG bundles within each subset of contiguous RBs of the CORESET and the first set of REG bundles within each subset of contiguous RBs of the CORESET.

Aspect 6: The method of aspect 3, further comprising: receiving control signaling indicating the first set of REG bundles of the CORESET within each subset of contiguous RBs of the CORESET; and determining the second set of REG bundles of the CORESET based at least in part on a difference between a total number of REG bundles of the CORESET within each subset of contiguous RBs of the CORESET and the first set of REG bundles within each subset of contiguous RBs of the CORESET.

Aspect 7: The method of aspect 3, wherein the first set of REG bundles of the CORESET is assigned to a first set of subsets of contiguous RBs of the CORESET; and the second set of REG bundles of the CORESET is assigned to a second set of subsets of contiguous RBs of the CORESET.

Aspect 8: The method of aspect 2, further comprising: identifying from the configuration message that a precoder granularity for the CORESET is configured as narrowband channel estimation.

Aspect 9: The method of aspect 8, wherein the first set of REG bundles of the CORESET comprises REG bundles with even index numbers; and the second set of REG bundles of the CORESET comprises REG bundles with odd index numbers.

Aspect 10: The method of any of aspects 2, 3, or 8, wherein the first set of REG bundles of the CORESET is defined by a ceiling function of a total number of REG bundles of the CORESET divided by two; and the second set of REG bundles of the CORESET is defined by a difference between the total number of REG bundles of the CORESET and the first set of REG bundles.

Aspect 11: The method of any of aspects 2, 3, or 8, further comprising: receiving control signaling indicating the first set of REG bundles of the CORESET and the second set of REG bundles of the CORESET.

Aspect 12: The method of any of aspects 1 through 11, wherein the FDM mapping comprises a first association between a first set of REG bundles of a plurality of CCEs and a first TCI state of the plurality of TCI states, and a second association between a second set of REG bundles of the plurality of CCEs and a second TCI state of the plurality of TCI states.

Aspect 13: The method of aspect 12, wherein the first set of REG bundles comprises REG bundles with even index numbers from CCEs with even index numbers and REG bundles with odd index numbers from CCEs with odd index numbers; and the second set of REG bundles comprises REG bundles with odd index numbers from CCEs with even index numbers and REG bundles with even index numbers from CCEs with odd index numbers.

Aspect 14: The method of aspect 12, wherein a first set of REG bundle indices are mapped to a second set of REG bundle indices based at least in part on an interleaver size; the first set of REG bundles comprise REG bundles having even indices from the first set of REG bundle indices; and the second set of REG bundles comprise REG bundles having odd indices from the first set of REG bundle indices.

Aspect 15: The method of any of aspects 12 through 14, wherein the first set of REG bundles comprises REG bundles from a first set of downlink control channel candidates; and the second set of REG bundles comprises REG bundles from a second set of downlink control channel candidates.

Aspect 16: The method of any of aspects 12 through 15, wherein the plurality of CCEs comprises a set of CCEs corresponding to a downlink control channel candidate.

Aspect 17: The method of any of aspects 1 through 16, wherein the FDM mapping comprises a first association between a first set of REG bundles of a plurality of super-bundles and a first TCI state of the plurality of TCI states, and a second association between a second set of REG bundles of the plurality of super-bundles and a second TCI state of the plurality of TCI states.

Aspect 18: The method of aspect 17, wherein a mapping between the resources of the CORESET and CCEs is mapped in units of super-bundles.

Aspect 19: The method of any of aspects 1 through 15 and 17 through 18, further comprising: receiving control signaling indicating a value for a REG bundle size corresponding to REG bundles of the CORESET, wherein a mapping type of the CORESET is configured as non-interleaved.

Aspect 20: The method of any of aspects 1 through 19, wherein one or more REG bundles comprise a first TCI state of the plurality of TCI states for a first set of RBs of the one or more REG bundles and a second TCI state of the plurality of TCI states for a second set of RBs of the one or more REG bundles.

Aspect 21: The method of aspect 20, wherein the UE assumes a same precoding within RBs having a same TCI state for channel estimation for a downlink control channel candidate.

Aspect 22: The method of any of aspects 1 through 21, wherein the configuration message comprises RRC signaling.

Aspect 23: A method for wireless communications at a base station, comprising: identifying an association between resources of a CORESET associated with a downlink control channel and a plurality of TCI states based at least in part on an FDM mapping; and transmitting a configuration message indicating that the CORESET is associated with the plurality of TCI states.

Aspect 24: The method of aspect 23, wherein the FDM mapping comprises a first association between a first set of REG bundles of the CORESET and a first TCI state of the plurality of TCI states, and a second association between a second set of REG bundles of the CORESET and a second TCI state of the plurality of TCI states.

Aspect 25: The method of aspect 24, further comprising: identifying from the configuration message that a precoder granularity for the CORESET is configured as wideband channel estimation.

Aspect 26: The method of aspect 25, further comprising: transmitting control signaling indicating the first set of REG bundles of the CORESET; and determining the second set of REG bundles of the CORESET based at least in part on a difference between a total number of REG bundles of the CORESET and the first set of REG bundles.

Aspect 27: The method of aspect 25, wherein the first set of REG bundles of the CORESET is defined by a ceiling function of a total number of REG bundles divided by two within each subset of contiguous RBs of the CORESET; and the second set of REG bundles of the CORESET is defined by a difference between the total number of REG bundles within each subset of contiguous RBs of the CORESET and the first set of REG bundles within each subset of contiguous RBs of the CORESET.

Aspect 28: The method of aspect 25, further comprising: transmitting control signaling indicating the first set of REG bundles of the CORESET within each subset of contiguous RBs of the CORESET; and determining the second set of REG bundles of the CORESET based at least in part on a difference between a total number of REG bundles of the CORESET within each subset of contiguous RBs of the CORESET and the first set of REG bundles within each subset of contiguous RBs of the CORESET.

Aspect 29: The method of aspect 25, wherein the first set of REG bundles of the CORESET is assigned to a first set of subsets of contiguous RBs of the CORESET; and the second set of REG bundles of the CORESET is assigned to a second set of subsets of contiguous RBs of the CORESET.

Aspect 30: The method of aspect 24, further comprising: identifying from the configuration message that a precoder granularity for the CORESET is configured as narrowband channel estimation.

Aspect 31: The method of aspect 30, wherein the first set of REG bundles of the CORESET comprises REG bundles with even index numbers; and the second set of REG bundles of the CORESET comprises REG bundles with odd index numbers.

Aspect 32: The method of any of aspects 24, 25 or 30, wherein the first set of REG bundles of the CORESET is defined by a ceiling function of a total number of REG bundles of the CORESET divided by two; and the second set of REG bundles of the CORESET is defined by a difference between the total number of REG bundles of the CORESET and the first set of REG bundles.

Aspect 33: The method of any of aspects 24, 25 or 30, further comprising: transmitting control signaling indicating the first set of REG bundles of the CORESET and the second set of REG bundles of the CORESET.

Aspect 34: The method of aspects 23 through 33, wherein the FDM mapping comprises a first association between a first set of REG bundles of a plurality of CCEs and a first TCI state of the plurality of TCI states, and a second association between a second set of REG bundles of the plurality of CCEs and a second TCI state of the plurality of TCI states.

Aspect 35: The method of aspect 34, wherein the first set of REG bundles comprises REG bundles with even index numbers from CCEs with even index numbers and REG bundles with odd index numbers from CCEs with odd index numbers; and the second set of REG bundles comprises REG bundles with odd index numbers from CCEs with even index numbers and REG bundles with even index numbers from CCEs with odd index numbers.

Aspect 36: The method of aspect 34, wherein a first set of REG bundle indices are mapped to a second set of REG bundle indices based at least in part on an interleaver size; the first set of REG bundles comprise REG bundles having even indices from the first set of REG bundle indices; and the second set of REG bundles comprise REG bundles having odd indices from the first set of REG bundle indices.

Aspect 37: The method of aspect 34, wherein the first set of REG bundles comprises REG bundles from a first set of downlink control channel candidates; and the second set of REG bundles comprises REG bundles from a second set of downlink control channel candidates.

Aspect 38: The method of any of aspects 34 through 37, wherein the plurality of CCEs comprises a set of CCEs corresponding to a downlink control channel candidate.

Aspect 39: The method of any of aspects 23 through 38, wherein the FDM mapping comprises a first association between a first set of REG bundles of a plurality of super-bundles and a first TCI state of the plurality of TCI states, and a second association between a second set of REG bundles of the plurality of super-bundles and a second TCI state of the plurality of TCI states.

Aspect 40: The method of aspect 39, wherein a mapping between the resources of the CORESET and CCEs is mapped in units of super-bundles.

Aspect 41: The method of any of aspects 23 through 40 and 42 through 40, further comprising: transmitting control signaling indicating a value for a REG bundle size corresponding to REG bundles of the CORESET, wherein a mapping type of the CORESET is configured as non-interleaved.

Aspect 42: The method of any of aspects 23 through 41, wherein one or more REG bundles comprise a first TCI state of the plurality of TCI states for a first set of RBs of the one or more REG bundles and a second TCI state of the plurality of TCI states for a second set of RBs of the one or more REG bundles.

Aspect 43: The method of any of aspects 23 through 42, wherein the configuration message comprises RRC signaling.

Aspect 44: An apparatus for wireless communications at a UE, comprising a processor; memory coupled with the processor; and instructions stored in the memory and executable by the processor to cause the apparatus to perform a method of any of aspects 1 through 22.

Aspect 45: An apparatus for wireless communications at a UE, comprising at least one means for performing a method of any of aspects 1 through 22.

Aspect 46: A non-transitory computer-readable medium storing code for wireless communications at a UE, the code comprising instructions executable by a processor to perform a method of any of aspects 1 through 22.

Aspect 47: An apparatus for wireless communications at a base station, comprising a processor; memory coupled with the processor; and instructions stored in the memory and executable by the processor to cause the apparatus to perform a method of any of aspects 23 through 43.

Aspect 48: An apparatus for wireless communications at a base station, comprising at least one means for performing a method of any of aspects 23 through 43.

Aspect 49: A non-transitory computer-readable medium storing code for wireless communications at a base station, the code comprising instructions executable by a processor to perform a method of any of aspects 23 through 43.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," or "component" may not be a substitute for the word "means." As such, no claim element is to be construed as a means plus function unless the element is expressly recited using the phrase "means for."

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving a configuration message indicating that a control resource set associated with a downlink control channel is associated with a plurality of transmission configuration indicator states comprising a first transmission configuration indicator state and a second transmission configuration indicator state;
receiving control signaling indicating a first set of resource element group bundles of the control resource set;
determining a second set of resource element group bundles of the control resource set based at least in part on a difference between a total number of resource element group bundles of the control resource set and the first set of resource element group bundles;
identifying an association between resources of the control resource set and the plurality of transmission configuration indicator states based at least in part on a frequency division multiplexing mapping, wherein the frequency division multiplexing mapping comprises a first association between the first set of resource element group bundles and the first transmission configuration indicator state, and a second association between the second set of resource element group bundles and the second transmission configuration indicator state; and decoding the downlink control channel based at least in part on the frequency division multiplexing mapping.

2. The method of claim 1, wherein the first set of resource element group bundles and the second set of resource element group bundles are included in the control resource set.

3. The method of claim 2, further comprising:
identifying from the configuration message that a precoder granularity for the control resource set is configured as wideband channel estimation.

4. The method of claim 3, wherein:
the first set of resource element group bundles of the control resource set is defined by a ceiling function of the total number of resource element group bundles divided by two within each subset of contiguous resource blocks of the control resource set; and
the second set of resource element group bundles of the control resource set is defined by the difference between the total number of resource element group bundles within each subset of contiguous resource blocks of the control resource set and the first set of resource element group bundles within each subset of the contiguous resource blocks of the control resource set.

5. The method of claim 3, wherein receiving the control signaling comprises:
receiving the control signaling indicating the first set of resource element group bundles of the control resource set within each subset of contiguous resource blocks of the control resource set; and wherein determining the second set of resource element group bundles comprises:
determining the second set of resource element group bundles of the control resource set based at least in part on the difference between the total number of resource element group bundles of the control resource set within each subset of the contiguous resource blocks of the control resource set and the first set of resource element group bundles within each subset of the contiguous resource blocks of the control resource set.

6. The method of claim 3, wherein:
the first set of resource element group bundles of the control resource set is assigned to a first set of subsets of contiguous resource blocks of the control resource set; and
the second set of resource element group bundles of the control resource set is assigned to a second set of subsets of the contiguous resource blocks of the control resource set.

7. The method of claim 2, further comprising:
identifying from the configuration message that a precoder granularity for the control resource set is configured as narrowband channel estimation.

8. The method of claim 7, wherein:
the first set of resource element group bundles of the control resource set comprises resource element group bundles with even index numbers; and
the second set of resource element group bundles of the control resource set comprises resource element group bundles with odd index numbers.

9. The method of claim 2, wherein:
the first set of resource element group bundles of the control resource set is defined by a ceiling function of the total number of resource element group bundles of the control resource set divided by two; and
the second set of resource element group bundles of the control resource set is defined by the difference between the total number of resource element group bundles of the control resource set and the first set of resource element group bundles.

10. The method of claim 2, wherein receiving the control signaling further comprises:
receiving control signaling indicating the first set of resource element group bundles of the control resource set and the second set of resource element group bundles of the control resource set.

11. The method of claim 1, wherein the first set of resource element group bundles and the second set of resource element group bundles are included in a plurality of control channel elements.

12. The method of claim 11, wherein:
the first set of resource element group bundles comprises resource element group bundles with even index numbers from control channel elements with even index numbers and resource element group bundles with odd index numbers from control channel elements with odd index numbers; and
the second set of resource element group bundles comprises resource element group bundles with odd index numbers from control channel elements with even index numbers and resource element group bundles with even index numbers from control channel elements with odd index numbers.

13. The method of claim 11, wherein:
a first set of resource element group bundle indices are mapped to a second set of resource element group bundle indices based at least in part on an interleaver size;
the first set of resource element group bundles comprise resource element group bundles having even indices from the first set of resource element group bundle indices; and
the second set of resource element group bundles comprise resource element group bundles having odd indices from the first set of resource element group bundle indices.

14. The method of claim 11, wherein:
the first set of resource element group bundles comprises resource element group bundles from a first set of downlink control channel candidates; and
the second set of resource element group bundles comprises resource element group bundles from a second set of downlink control channel candidates.

15. The method of claim 11, wherein the plurality of control channel elements comprises a set of control channel elements corresponding to a downlink control channel candidate.

16. The method of claim 1, wherein the first set of resource element group bundles and the second set of resource element group bundles are included in a plurality of super-bundles, and wherein a mapping between the resources of the control resource set of control channel elements is mapped in units of super-bundles.

17. The method of claim 1, further comprising:
receiving an indication of a value for a resource element group bundle size corresponding to resource element group bundles of the control resource set, wherein a mapping type of the control resource set is configured as non-interleaved.

18. The method of claim 1, wherein one or more resource element group bundles comprise a third transmission configuration indicator state of the plurality of transmission configuration indicator states for a first set of resource blocks of the one or more resource element group bundles and a fourth transmission configuration indicator state of the plurality of transmission configuration indicator states for a second set of resource blocks of the one or more resource element group bundles, and wherein the UE assumes a same precoding within resource blocks having a same transmission configuration indicator state for channel estimation for a downlink control channel candidate.

19. A method for wireless communications at a network device, comprising:
transmitting control signaling indicating a first set of resource element group bundles of a control resource set associated with a downlink control channel;
determining a second set of resource element group bundles of the control resource set based at least in part on a difference between a total number of resource element group bundles of the control resource set and the first set of resource element group bundles;
identifying an association between resources of the control resource set and a plurality of transmission configuration indicator states based at least in part on a frequency division multiplexing mapping, wherein the frequency division multiplexing mapping comprises a first association between the first set of resource element group bundles and a first transmission configuration indicator state of the plurality of transmission configuration indicator states, and a second association between the second set of resource element group bundles and a second transmission configuration indicator state of the plurality of transmission configuration indicator states; and
transmitting a configuration message indicating that the control resource set is associated with the plurality of transmission configuration indicator states.

20. The method of claim 19, wherein the first set of resource element group bundles and the second set of resource element group bundles are included in the control resource set.

21. The method of claim 20, further comprising:
identifying from the configuration message that a precoder granularity for the control resource set is configured as wideband channel estimation.

22. The method of claim 21, wherein:
the first set of resource element group bundles of the control resource set is defined by a ceiling function of the total number of resource element group bundles divided by two within each subset of contiguous resource blocks of the control resource set; and
the second set of resource element group bundles of the control resource set is defined by the difference between the total number of resource element group bundles within each subset of the contiguous resource blocks of the control resource set and the first set of resource element group bundles within each subset of the contiguous resource blocks of the control resource set.

23. The method of claim 20, further comprising:
identifying from the configuration message that a precoder granularity for the control resource set is configured as narrowband channel estimation.

24. The method of claim 23, wherein:
the first set of resource element group bundles of the control resource set comprises resource element group bundles with even index numbers; and
the second set of resource element group bundles of the control resource set comprises resource element group bundles with odd index numbers.

25. The method of claim 20, wherein:
the first set of resource element group bundles of the control resource set is defined by a ceiling function of the total number of resource element group bundles of the control resource set divided by two; and
the second set of resource element group bundles of the control resource set is defined by the difference between the total number of resource element group bundles of the control resource set and the first set of resource element group bundles.

26. The method of claim 20, wherein transmitting the control signaling further comprises:
transmitting the control signaling indicating the first set of resource element group bundles of the control resource set and the second set of resource element group bundles of the control resource set.

27. An apparatus for wireless communications at a user equipment (UE), comprising:
a processor,
memory coupled with the processor; and
instructions stored in the memory and executable by the processor to cause the apparatus to:
receive a configuration message indicating that a control resource set associated with a downlink control channel is associated with a plurality of transmission configuration indicator states comprising a first transmission configuration indicator state and a second transmission configuration indicator state;
receive control signaling indicating a first set of resource element group bundles of the control resource set;
determine a second set of resource element group bundles of the control resource set based at least in part on a difference between a total number of resource element group bundles of the control resource set and the first set of resource element group bundles;
identify an association between resources of the control resource set and the plurality of transmission configuration indicator states based at least in part on a frequency division multiplexing mapping, wherein the frequency division multiplexing mapping comprises a first association between the first set of resource element group bundles and the first transmission configuration indicator state, and a second association between the second set of resource element group bundles and the second transmission configuration indicator state; and
decode the downlink control channel based at least in part on the frequency division multiplexing mapping.

28. An apparatus for wireless communications at a network device, comprising:
a processor,
memory coupled with the processor; and
instructions stored in the memory and executable by the processor to cause the apparatus to:
transmit control signaling indicating a first set of resource element group bundles of a control resource set associated with a downlink control channel;

determine a second set of resource element group bundles of the control resource set based at least in part on a difference between a total number of resource element group bundles of the control resource set and the first set of resource element group bundles;

identify an association between resources of the control resource set and a plurality of transmission configuration indicator states based at least in part on a frequency division multiplexing mapping, wherein the frequency division multiplexing mapping comprises a first association between the first set of resource element group bundles and a first transmission configuration indicator state of the plurality of transmission configuration indicator states, and a second association between the second set of resource element group bundles and a second transmission configuration indicator state of the plurality of transmission configuration indicator states; and transmit a configuration message indicating that the control resource set is associated with the plurality of transmission configuration indicator states.

* * * * *